US011993969B1

(12) United States Patent
Weinerman et al.

(10) Patent No.: US 11,993,969 B1
(45) Date of Patent: May 28, 2024

(54) HINGE

(71) Applicant: The Eastern Company, Cleveland, OH (US)

(72) Inventors: Lee S. Weinerman, Medina, OH (US); Scott Arthurs, Brunswick, OH (US)

(73) Assignee: THE EASTERN COMPANY, Cleveland, OH (US)

( * ) Notice: Subject to any disclaimer, the term of this patent is extended or adjusted under 35 U.S.C. 154(b) by 98 days.

(21) Appl. No.: 17/861,682

(22) Filed: Jul. 11, 2022

Related U.S. Application Data

(60) Provisional application No. 63/221,767, filed on Jul. 14, 2021.

(51) Int. Cl.

| | |
|---|---|
| ***E05D 5/06*** | (2006.01) |
| ***E05D 3/02*** | (2006.01) |
| ***E05D 3/12*** | (2006.01) |
| ***E05D 11/10*** | (2006.01) |

(52) U.S. Cl.
CPC ................. *E05D 5/06* (2013.01); *E05D 3/02* (2013.01); *E05D 3/127* (2013.01); *E05D 11/1014* (2013.01); *E05D 2003/027* (2013.01); *E05D 2005/067* (2013.01); *E05Y 2900/531* (2013.01)

(58) Field of Classification Search
CPC ........... E05D 5/06; E05D 5/062; E05D 5/065; E05D 2005/067; E05D 11/1014; E05D 11/1021; E05D 11/105; E05D 11/1057; E05D 3/02; E05D 2003/027; E05D 3/12; E05D 3/125; E05D 3/127
See application file for complete search history.

(56) References Cited

U.S. PATENT DOCUMENTS

| | | | | | |
|---|---|---|---|---|---|
| 1,340,151 | A * | 5/1920 | Bump | E05D 9/00 | 16/374 |
| 2,143,736 | A * | 1/1939 | Lefevre | E05D 11/1057 | 16/361 |
| 2,163,323 | A * | 6/1939 | Howe | E05F 5/06 | 49/400 |
| 2,179,113 | A * | 11/1939 | Bates | E05D 5/062 | 16/235 |
| 3,962,749 | A * | 6/1976 | Abolins | E05D 11/06 | 16/382 |
| 4,242,773 | A * | 1/1981 | Beigh | E05D 3/12 | 16/371 |

(Continued)

*Primary Examiner* — Jeffrey O'Brien
(74) *Attorney, Agent, or Firm* — Ralph E. Jocke; Walker & Jocke

(57) ABSTRACT

An exemplary hinge (36, 88) is used to connect a body door (84, 162) in movable operative connection with a body (12, 102). The hinge enables selectively moving the door to open and close a body opening (82, 164). The hinge includes a primary hinge butt (38, 90) which includes a primary hinge butt knuckle (40, 104). A primary hinge strap (60, 114) includes a primary hinge strap knuckle (62, 116) which enables relative rotational movement of the primary hinge butt and the primary hinge strap. The door is in operatively attached connection with the primary hinge strap. A secondary hinge butt (132) may be in operative connection with the primary hinge strap to enable relative rotational movement of the door relative to the primary hinge strap in the hinge open position. A disengageable latch may be used to hold the secondary hinge butt in a fixed rotational position.

27 Claims, 21 Drawing Sheets

(56) References Cited

U.S. PATENT DOCUMENTS

| | | | | | |
|---|---|---|---|---|---|
| 4,389,748 | A * | 6/1983 | Grossman | E05D 3/12 | 16/302 |
| 5,075,928 | A * | 12/1991 | Bobrowski | E05D 5/06 | 16/382 |
| 5,493,760 | A * | 2/1996 | Takimoto | E05D 3/12 | 16/376 |
| 5,561,887 | A * | 10/1996 | Neag | E05D 3/127 | 16/334 |
| 5,606,774 | A * | 3/1997 | Wu | E05D 3/12 | 16/366 |
| 6,196,617 | B1 * | 3/2001 | Beck | B60J 5/105 | 16/334 |
| 6,256,839 | B1 * | 7/2001 | Wu | E05F 1/1215 | 16/302 |
| 7,076,836 | B1 * | 7/2006 | Butka | E05D 11/1057 | 16/334 |
| 8,147,015 | B2 * | 4/2012 | Kim | E05D 5/14 | 16/268 |
| 8,739,367 | B2 * | 6/2014 | Park | E05D 5/06 | 16/245 |
| 2005/0204510 | A1 * | 9/2005 | Heimann | E05D 3/12 | 16/366 |
| 2023/0366249 | A1 * | 11/2023 | Nöthe | E05B 65/00 | |

* cited by examiner

Fig. 35
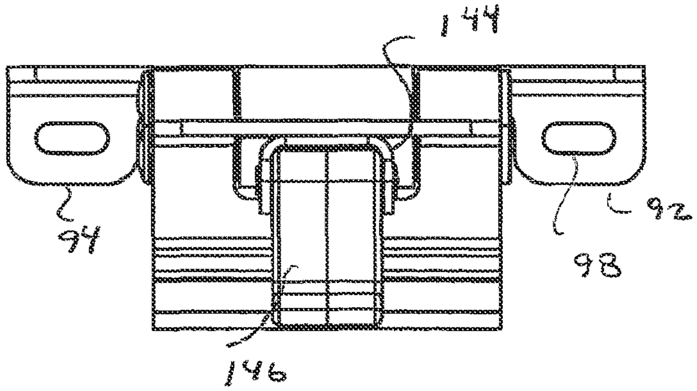
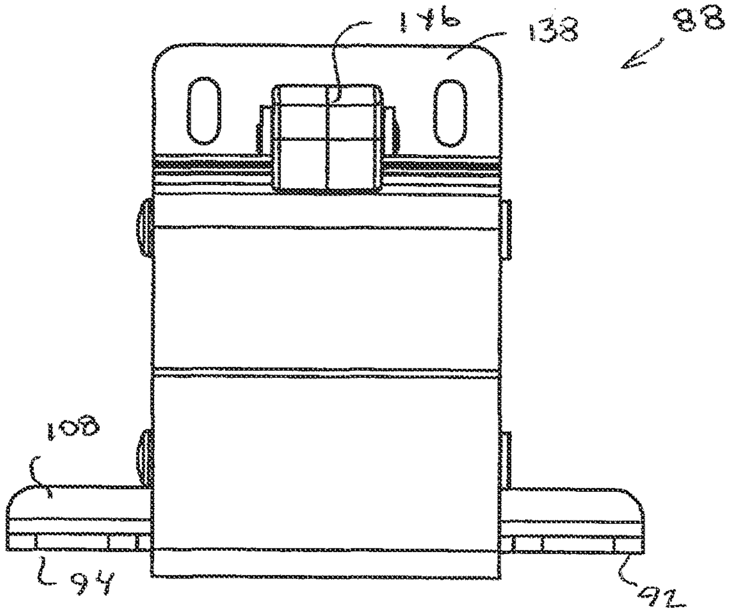
Fig. 32
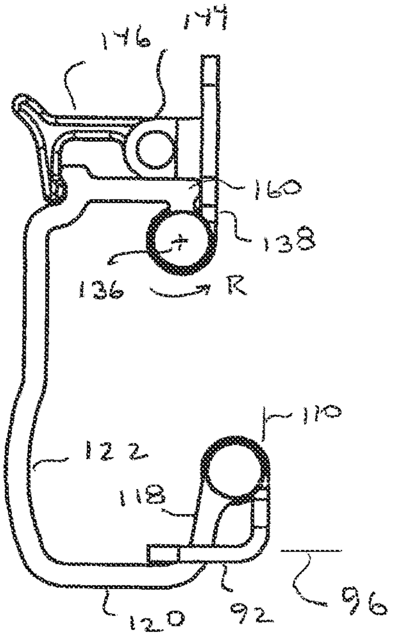
Fig. 33
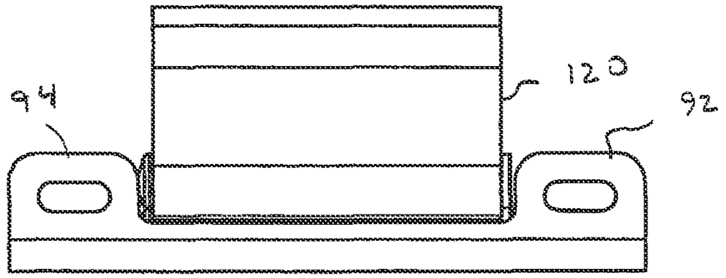
Fig. 34

HINGE

TECHNICAL FIELD

Exemplary arrangements relate to a hinge apparatus that can be used to movably mount a door or similar relatively movable structure with regard to another structure such as a body that includes a body opening.

BACKGROUND

There are many types of devices and structures in which components need to be relatively movably mounted. Such structures and devices often include a body which has an access opening to an interior area thereof. To control access to the interior area, a door may be movably mounted in operative connection with the body. The door may be movably mounted in operative connection with the body through one or more hinges. Different types of hinges may be used depending on the type of door and body structure involved, the level of security required to prevent removal of the door by compromising the hinge or hinges, and aesthetic considerations.

Hinges may benefit from improvements.

SUMMARY

Exemplary arrangements relate to apparatus that includes a hinge. The hinge is mounted in operative connection with a body which includes an opening that provides access to an interior area within the body. The hinge is also in operative connection with a door. The door is configured to close the body opening when the hinge is in a hinge closed position. Exemplary arrangements enable movement of the door from the position closing the body opening to a position in which the hinge is in a hinge open position and the door is disposed at least partially away from the opening to enable access from outside through the opening to the interior area of the body. Exemplary arrangements include a hinge that is within the body interior area in the hinge closed position. Further exemplary arrangements may provide for the body and the door to extend in a common plane when the hinge is in the hinge closed position. Further exemplary arrangements may provide for the outer peripheral surface of the door to be positioned in close proximity to the sides of the body opening when the door is in a closed position, and to avoid interference with the sides of the opening when the door moves into and away from the body opening.

Some exemplary arrangements provide for a door that is movable generally about 900 between the hinge closed position and the hinge open position. Other exemplary arrangements enable the door to further move when in the hinge open position into a position in which the door extends away from and generally parallel to the body opening. Numerous different capabilities of exemplary arrangements of hinges and associated structures are described in the following Detailed Description.

BRIEF DESCRIPTION OF DRAWINGS

FIG. 32 is a back side view of the alternative hinge.

FIG. 33 is a left side view of the alternative hinge.

FIG. 34 is a bottom view of the hinge.

FIG. 35 is a top view of the hinge.

DETAILED DESCRIPTION

Figure 1:
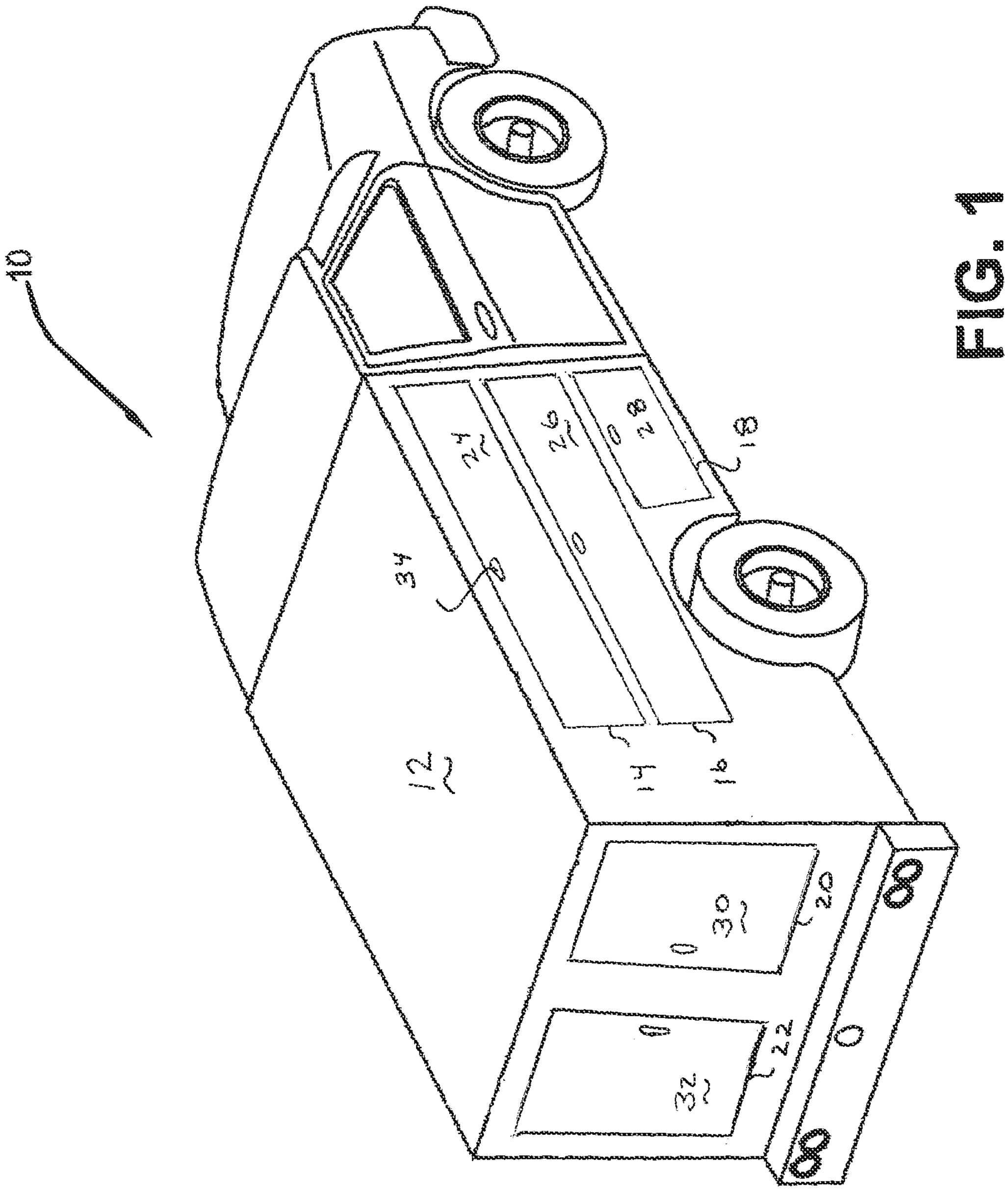
FIG. 1 is an isometric view of an exemplary service vehicle with a body that includes a plurality of body openings and respective doors that are movably mounted in in operative connection with the body through exemplary hinges.

Referring now to the drawings and particularly to FIG. 1 there is shown therein a service vehicle generally indicated 10. The exemplary service vehicle is used for commercial or service activities such as various forms of construction, repair, painting, cleaning or other types of activities that require the use of tools or materials that are transported in the service vehicle. The exemplary service vehicle includes a body 12. The exemplary body 12 houses a number of compartments in its interior area. In the exemplary arrangement the body 12 includes a number of openings 14, 16, 18, 20, 22 each associated with a respective interior compartment area. Each respective opening is selectively closed by a respective door 24, 26, 28, 30, 32. Each of the doors has associated door latch, such as for example latch 34. The exemplary latches are configured to hold the associated door in a closed position and can be actuated to enable the door to be opened. In the exemplary service vehicle body 12, doors 24, 26 and 28 are configured to be opened by being moved in supported connection with the body through exemplary hinges rotationally about a horizontal axis outwardly and downwardly. Other doors such as doors 30 and 32 are configured to be opened by being moved in supported connection with the body through exemplary hinges rotationally about a vertical axis outwardly and sideways.

Hinges of the exemplary arrangements described herein may be utilized in connection with doors that are utilized to close openings in a body of a service vehicle. However it should be understood that hinges of the exemplary arrangements may also be used in numerous other applications where doors or other components need to be movably mounted in connection with a body or other structure to selectively open and close openings or enable movement of other features.

Figure 2:
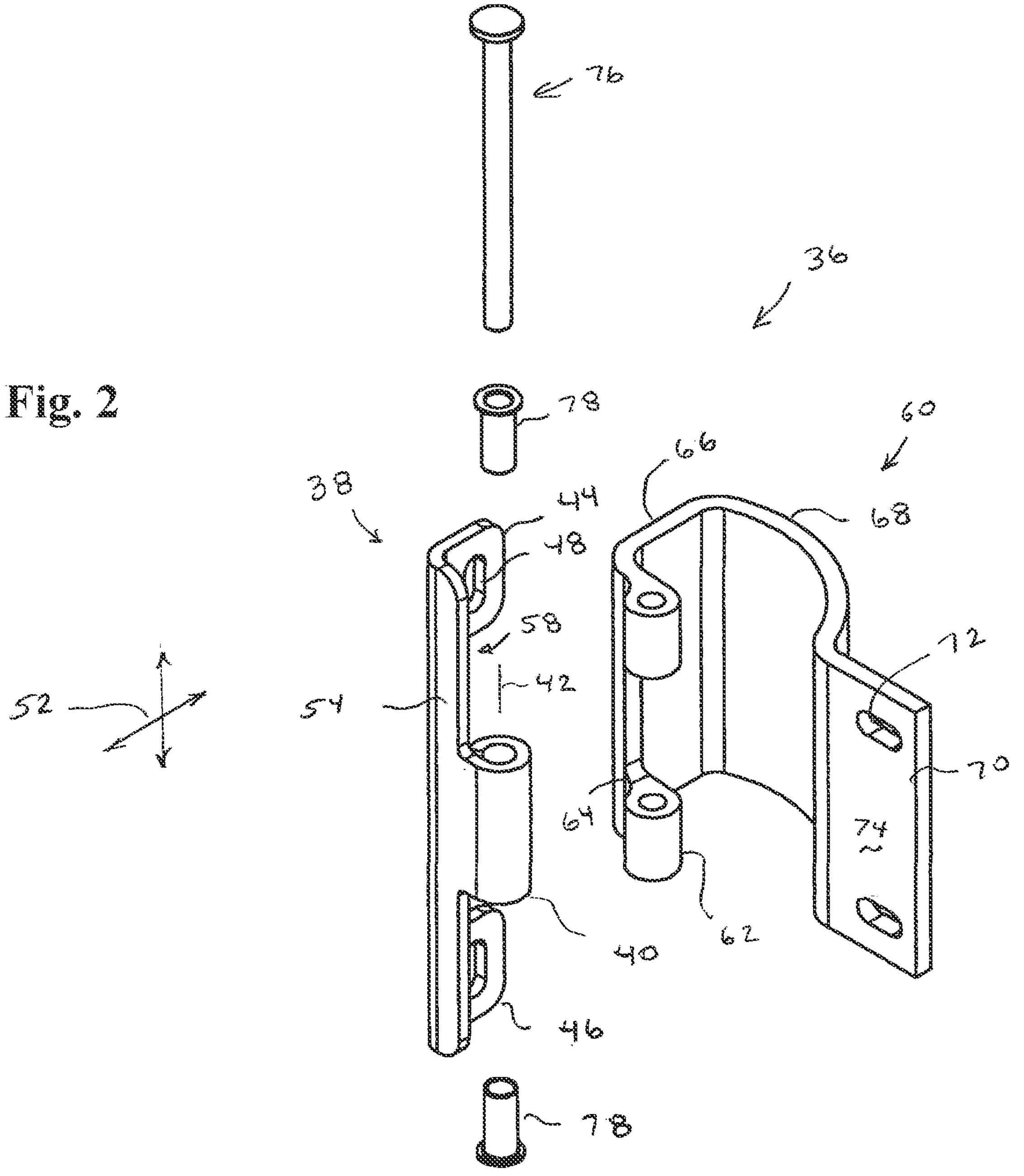
FIG. 2 is an exploded view of an exemplary hinge.

FIG. 2 shows an exploded view of a hinge 36 of an exemplary arrangement. The exemplary hinge includes a primary hinge butt 38. For purposes of this disclosure a hinge butt refers to a component of a hinge that includes a knuckle and a mounting structure such as a leaf, an ear, a plate or other mount. The exemplary primary hinge butt 38 includes a primary hinge butt knuckle 40. The primary hinge butt knuckle includes an opening therethrough that extends along a primary hinge butt knuckle axis 42.

Figures 3, 4, 5, 6, 7:
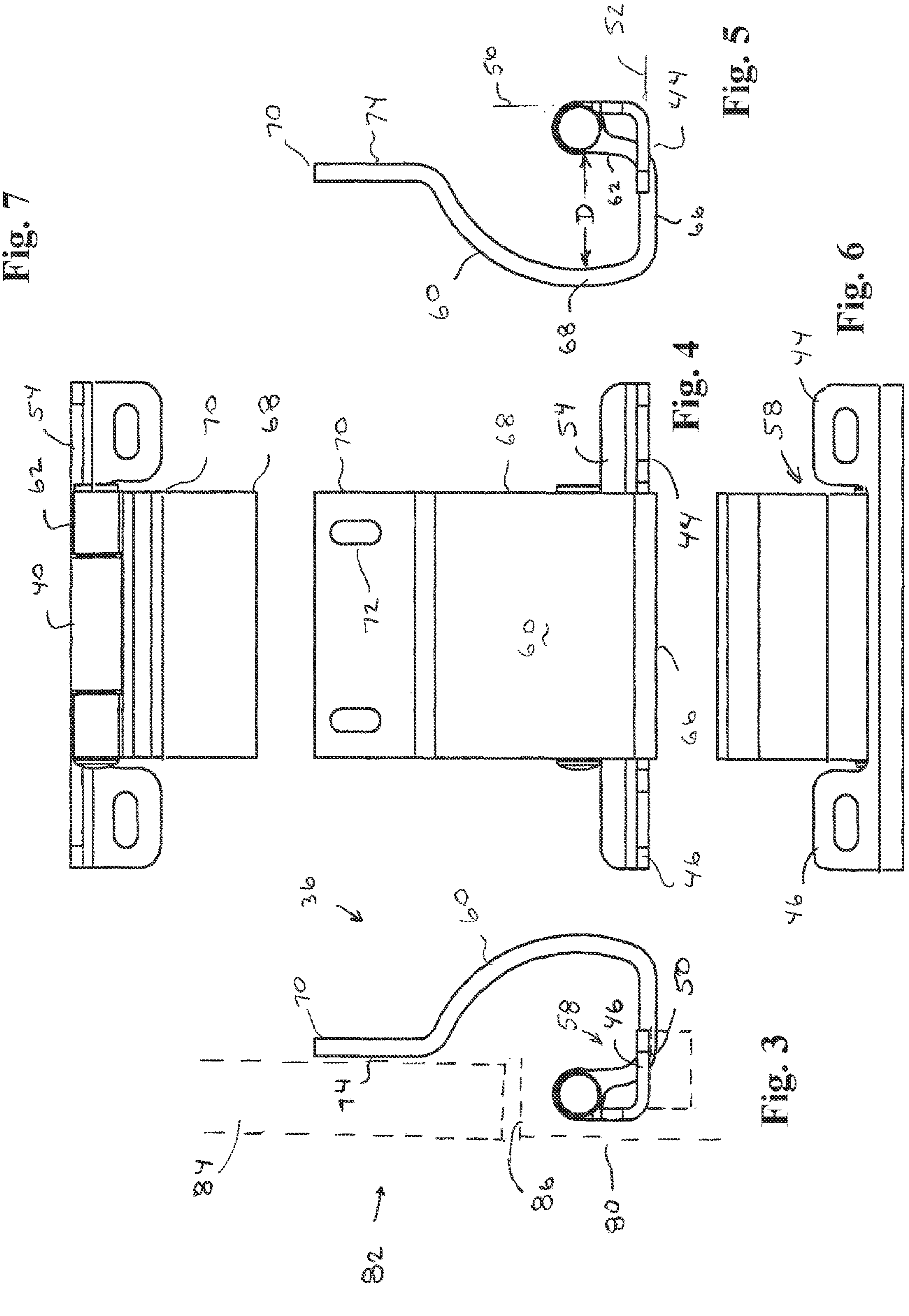
FIG. 3 is a right side view of the exemplary hinge shown in a hinge closed position with a door, a body opening and a body shown in phantom.
FIG. 4 is a back view of the exemplary hinge shown in FIG. 3.
FIG. 5 is a left side view of the hinge.
FIG. 6 is a bottom view of the hinge.
FIG. 7 is a top view of the hinge.
Figure 8:
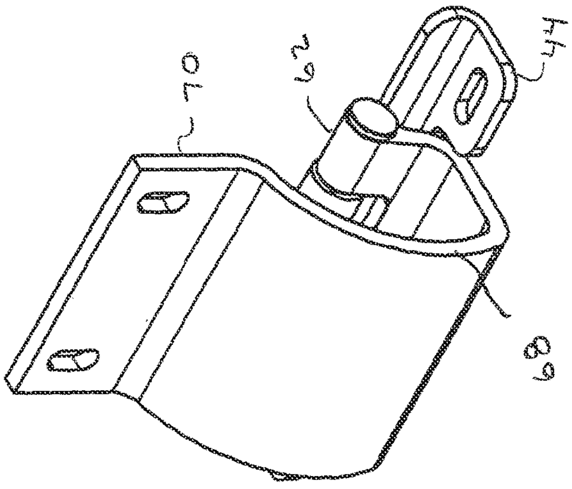
FIG. 8 is a back top left perspective view of the hinge.
Figure 9:
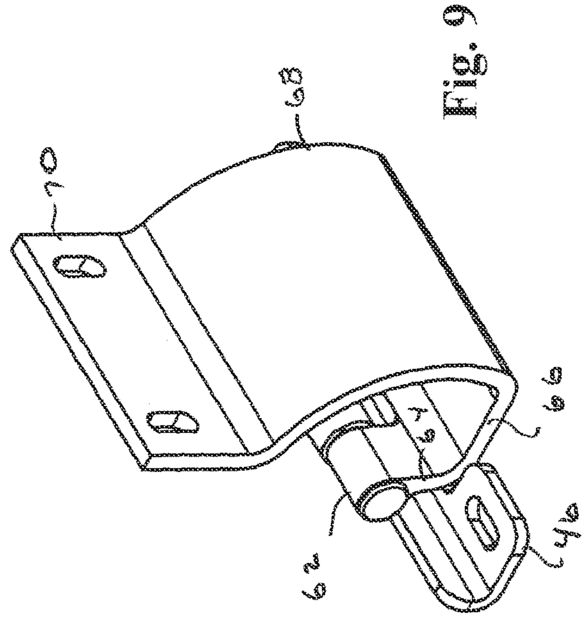
FIG. 9 is a back top right perspective view of the hinge.
Figure 10:
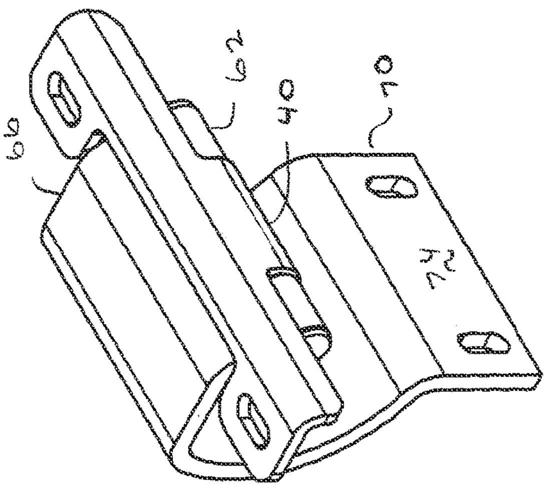
FIG. 10 is a front bottom right perspective view of the hinge.
Figure 11:
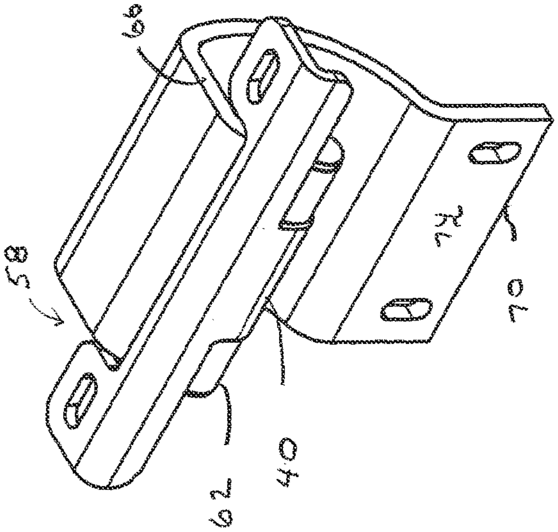
FIG. 11 is a front bottom left perspective view of the hinge.
Figure 13:
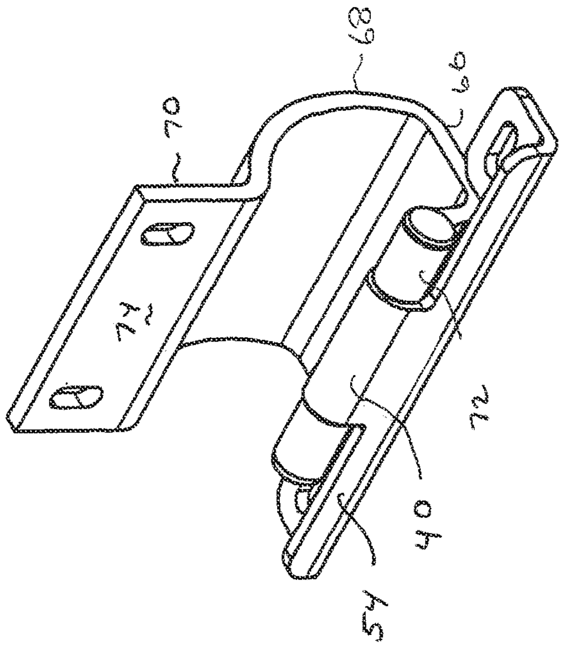
FIG. 13 is a front top right perspective view of the hinge.
Figure 15:
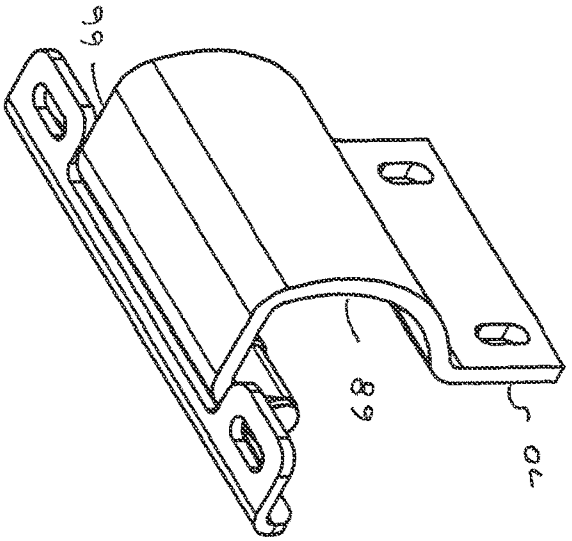
FIG. 15 is a bottom back left perspective view of the hinge.
Figure 12:
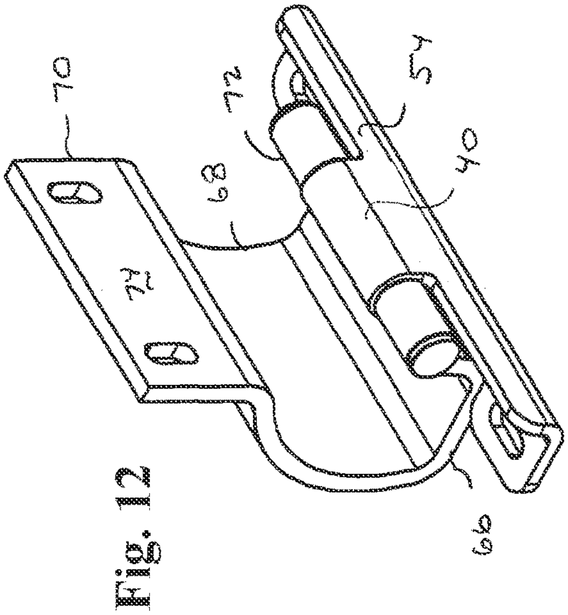
FIG. 12 is a front top left perspective view of the hinge.
Figure 14:
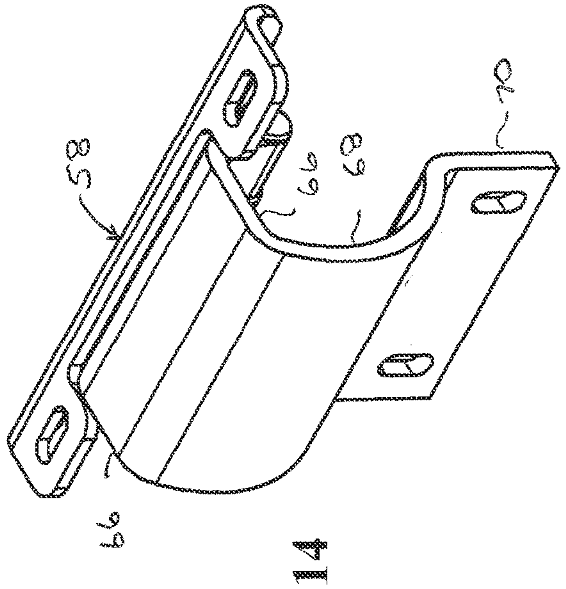
FIG. 14 is a bottom back right perspective view of the hinge.
Figure 16:
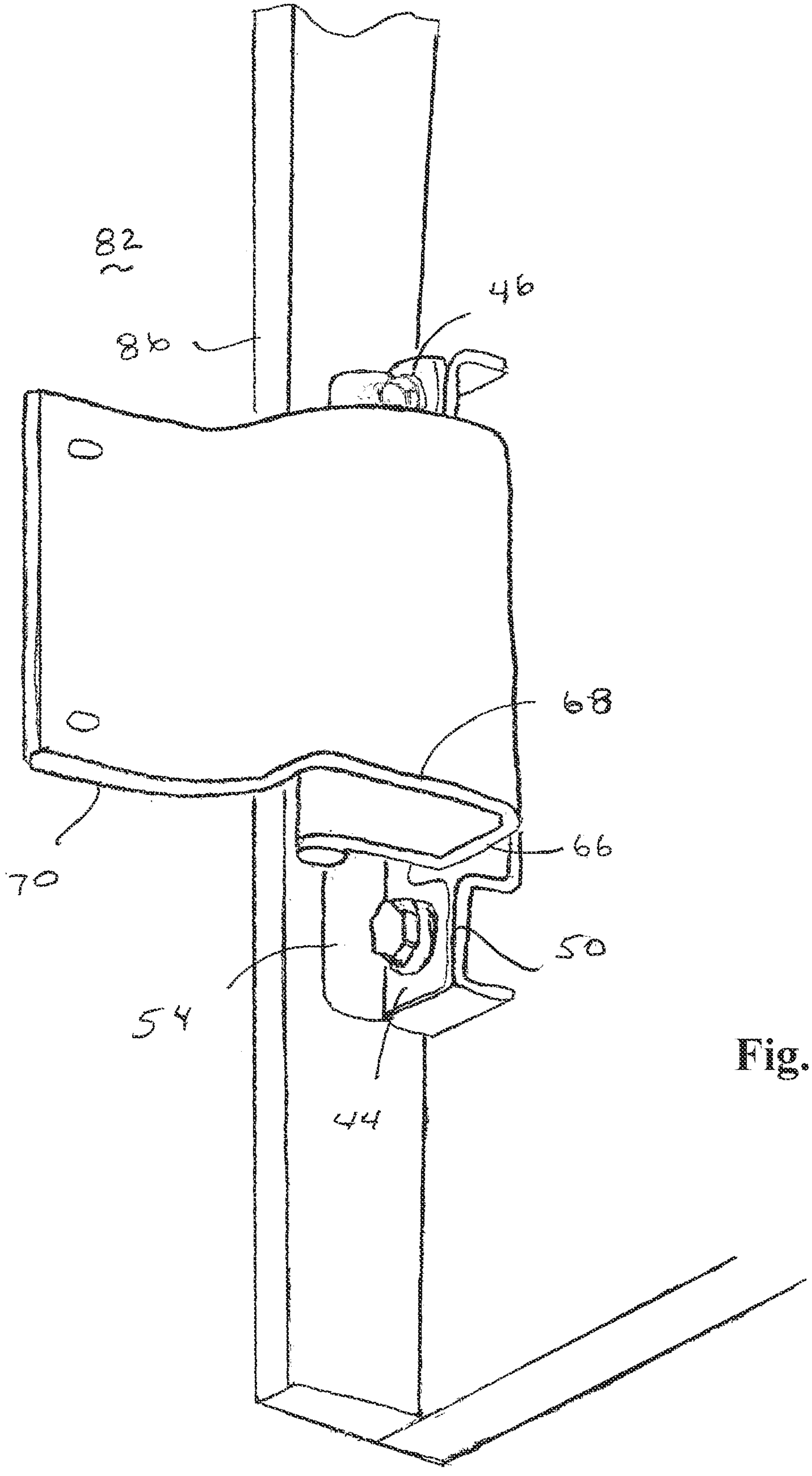
FIG. 16 is a back bottom perspective view of the hinge shown in a hinge closed position and in attached connection with a body.

The primary hinge butt 38 further includes a pair of axially spaced primary hinge butt ears 44, 46. The primary hinge butt ears serve as a hinge mount that is used to attach the primary hinge butt in fixed operative connection with the body. The primary hinge butt ears each include respective mounting openings 48. Mounting openings 48 are configured to receive a fastener that is operative to hold the primary hinge butt in operative fixed connection with the body. In the exemplary arrangement each primary hinge butt ear is configured to abuttingly engage a mounting face within the interior of the body, such as mounting face 50 shown in FIGS. 3 and 16. The exemplary hinge butt ears 44, 46 extend in a common primary hinge butt ear plane 52 as represented in FIGS. 1 and 5. Of course it should be understood that this approach for mounting the primary hinge butt in fixed operative connection with the body is exemplary and in other arrangements other configurations and approaches may be used.

The exemplary primary hinge butt 38 further includes a hinge butt knuckle support leg 54. The primary hinge butt knuckle support leg extends along a primary hinge butt knuckle support leg plane 56 that extends generally perpendicular to the primary hinge butt ear plane 52 as represented in FIG. 5. When used herein the term generally perpendicular refers to perpendicular plus or minus 30°. In the exemplary configuration the primary hinge butt knuckle support leg 54 is radially offset from the primary hinge butt knuckle axis and extends tangentially relative to the hinge butt knuckle outer surface. In the exemplary arrangement the hinge butt knuckle support leg 54 is in fixed operative connection with each of the primary hinge butt ears 44, 46. A strap leg access opening 58 extends between the primary hinge butt ears 44 and 46 in the primary hinge butt ear plane 52.

In the exemplary arrangement the primary hinge butt knuckle axis extends generally parallel to the primary hinge butt knuckle support leg plane and generally parallel to the primary hinge butt ear plane. When used herein generally parallel refers to parallel plus or minus 30°. Further in the exemplary arrangement the primary hinge butt knuckle is disposed away from the primary hinge butt ears in a primary hinge butt spaced direction, which primary hinge butt spaced direction extends parallel to the primary hinge butt support leg plane 56. Further in the exemplary arrangement the primary hinge butt knuckle is disposed axially intermediate of the primary hinge butt ears and in overlying relation of the strap leg access opening 58 in the primary hinge butt knuckle spaced direction. Of course it should be understood that this arrangement and configuration is exemplary and in other arrangements other approaches and configurations may be used.

The exemplary hinge 36 further includes a primary hinge strap 60. The exemplary primary hinge strap 60 includes a pair of primary hinge strap knuckles 62. Each primary hinge strap knuckle 62 is coaxial with the primary hinge butt knuckle 40 and the primary hinge butt knuckle axis 42. However it should be understood that in other arrangements the primary hinge strap may include only one primary hinge strap knuckle or more than a pair of primary hinge strap knuckles.

Each primary hinge strap knuckle is in fixed operative connection with a primary hinge strap knuckle leg 64. Each primary hinge strap knuckle leg 64 is offset from the primary hinge butt knuckle axis. Further each primary hinge strap knuckle leg 64 is extendable in the strap leg access opening 58 in the hinge closed position of the hinge as shown in FIGS. 8-15. Of course it should be understood that this configuration is exemplary and other arrangements other configurations may be used.

The exemplary primary hinge strap 60 further includes a primary hinge strap offset leg 66. The primary hinge strap offset leg 66 is in fixed operative connection with the primary hinge strap knuckle legs 64. The exemplary primary hinge strap offset leg 66 extends generally perpendicular to the primary hinge strap knuckle legs.

The exemplary primary hinge strap 60 further includes a primary hinge strap mounting leg 68. The primary hinge strap mounting leg 68 is in fixed operative connection with the primary hinge strap offset leg 66. The primary hinge strap mounting leg extends generally parallel to the primary hinge strap knuckle legs 64. The primary hinge strap mounting leg is disposed away from the primary hinge strap knuckle legs an offset leg distance indicated D in FIG. 5.

Primary hinge strap 60 is further in operative connection with a door mount 70. The exemplary door mount of hinge 36 is in fixed operative connection with primary hinge strap mounting leg 68. However in other exemplary arrangements such as some subsequently discussed, the door mount may be relatively movably mounted with respect to the primary hinge strap mounting leg. The exemplary door mount includes at least one door mount opening 72. The exemplary door mount openings are configured to receive at least one door mounting fastener that is operative to hold the door mount and the door in fixed operative engagement.

The exemplary door mount 70 includes a generally planar door mount face 74. The door mount face 74 in the exemplary arrangement is configured to extend generally parallel to inside and outside faces of the door as represented schematically in FIG. 3. The generally planar door mount face 74 in the hinge closed position extends generally perpendicular to the primary hinge butt ear plane 52 and generally parallel to the primary hinge butt axis 42. Of course this arrangement is exemplary and other arrangements other configurations may be used.

The exemplary hinge 36 further includes a hinge pin 76. The exemplary hinge pin 76 extends along the primary hinge butt axis 42. Hinge pin 76 extends in each primary hinge strap knuckle 62 and in the primary hinge butt knuckle 40. The exemplary hinge arrangement includes a pair of flanged bushings 78. One flanged bushing extends in the opening within the primary hinge butt knuckle 40 at each axial side. The exemplary flanged bushings 78 reduce friction and facilitate relative rotational movement of the primary hinge strap and the primary hinge butt about the primary hinge butt axis. Of course it should be understood that this arrangement is exemplary and in other arrangements other configurations may be used.

The hinge closed position of the exemplary hinge 36 is shown schematically in FIG. 3. The primary hinge butt ears 44, 46 are mounted in abutting engagement with the mounting faces 50 that are fixed within the interior area of the body 80. The body opening 82 is closed by the body door 84 in the hinge closed position. In the exemplary arrangement the body opening is a rectangular opening that is bounded by a plurality of sides including a hinge side 86 that is adjacent to the hinge. As shown in FIG. 3 in the exemplary arrangement in the hinge closed position the side faces bounding the body door 84 are in close proximity to the sides bounding the opening. The exemplary hinge provides for movement of the door in a manner that enables the door to move into and out of the body opening 82 without interference with the sides of the opening.

FIGS. 3 through 16 show the exemplary hinge 36 in a hinge closed position in which the body door closes the body opening. In the hinge closed position, the primary hinge strap knuckle legs 64 extend in the strap leg access opening 58. The primary hinge strap knuckle legs 64 also extend generally parallel to the hinge butt knuckle support leg 54 and the hinge butt knuckle support leg plane 56. Further in the hinge closed position of the exemplary hinge the primary hinge strap offset leg 66 extends generally parallel to the primary hinge butt ear plane while the primary hinge strap mounting leg 68 extends generally perpendicular to the primary hinge butt ear plane 52. Further in the exemplary arrangement the door mount 70 and the door mount face 74 thereof also extend generally perpendicular to the primary hinge butt ear plane 52.

As can be appreciated this exemplary arrangement enables the hinge to be mounted within the interior area of the body so as to prevent access to the hinge knuckles and hinge pin with the body door in the position closing the body opening. Further this exemplary arrangement enables the door mount to be recessed inwardly within the body from the body opening so that the door extends within the body opening. In some exemplary arrangements such as that shown in FIG. 3, this enables the exterior face of the body and the exterior face of the door to extend generally parallel, and in some arrangements generally within a common plane. This provides a uniform surface that can prevent snagging on adjacent surfaces and may also provide a better aesthetic appearance. Further the exemplary configuration of the primary hinge strap and the primary hinge butt enables the door to move from the closed position to the open position in a manner that facilitates movement of the door outwardly without engagement or binding with the door opening including inward extending walls of the body that may bound the particular door opening. Of course it should be understood that these aspects of the exemplary arrangement need not be present in other exemplary arrangements in which a hinge having the features discussed and claimed herein is used.

Figures 17, 18, 19, 20, 21:
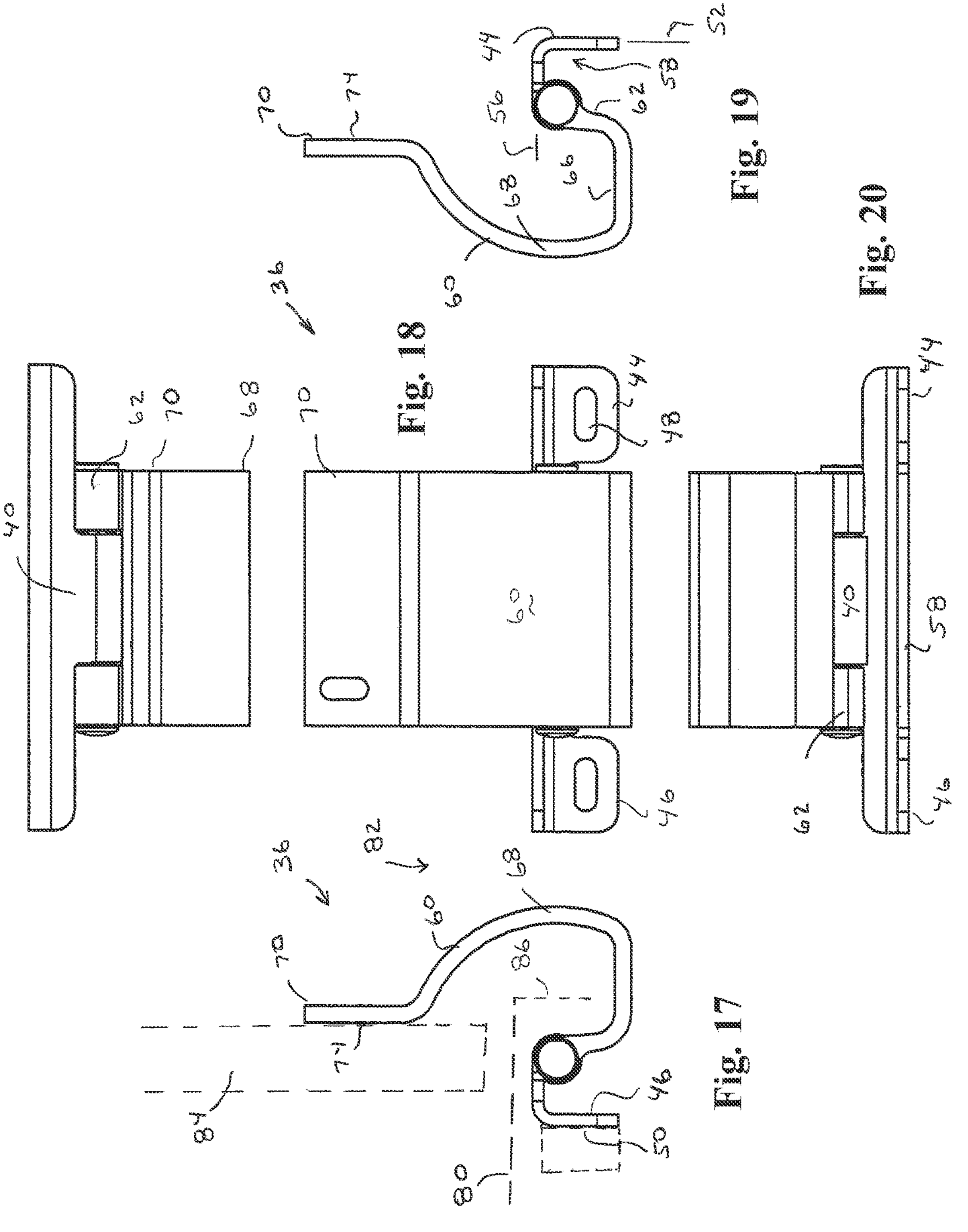
FIG. 17 is a right side view of the hinge in a hinge open position with the body, the body opening and the door shown in phantom.
FIG. 18 is a back view of the hinge in the hinge open position as shown in FIG. 17.
FIG. 19 is a left side view of the hinge.
FIG. 20 is a bottom view of the hinge.
FIG. 21 is a top view of the hinge.
Figure 23:
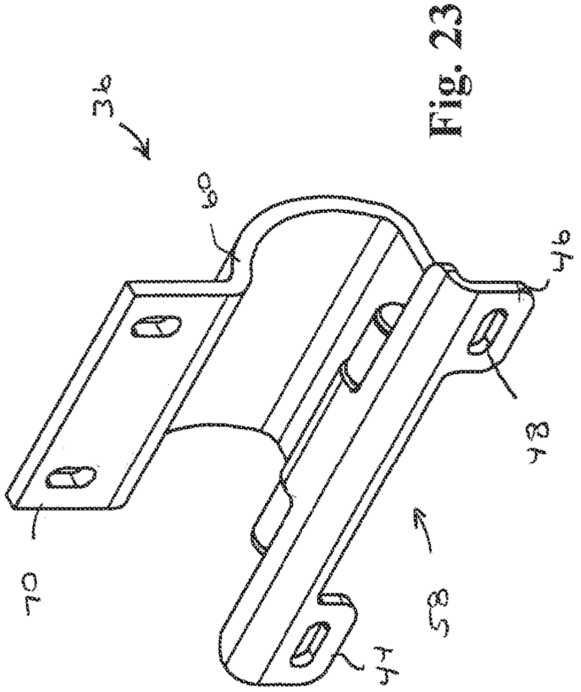
FIG. 23 is a front top right perspective view of the hinge.
Figure 25:
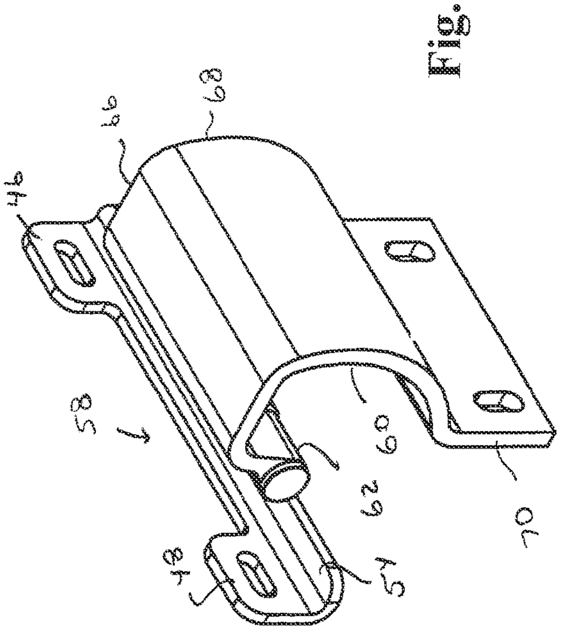
FIG. 25 is a back bottom left perspective view of the hinge.
Figure 22:
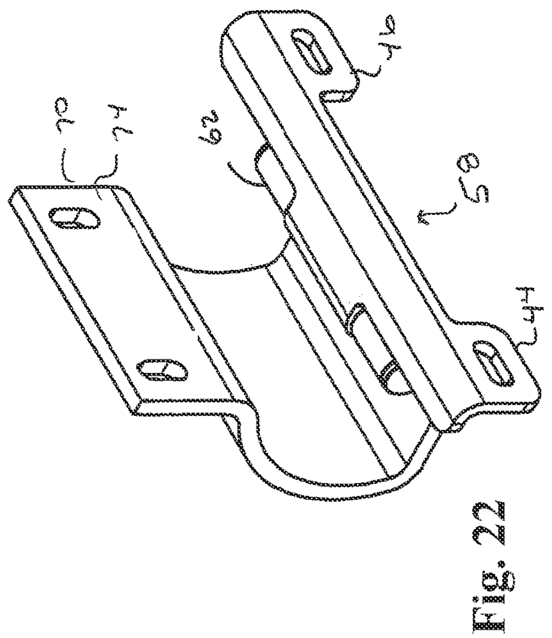
FIG. 22 is a front top left perspective view of the hinge.
Figure 24:
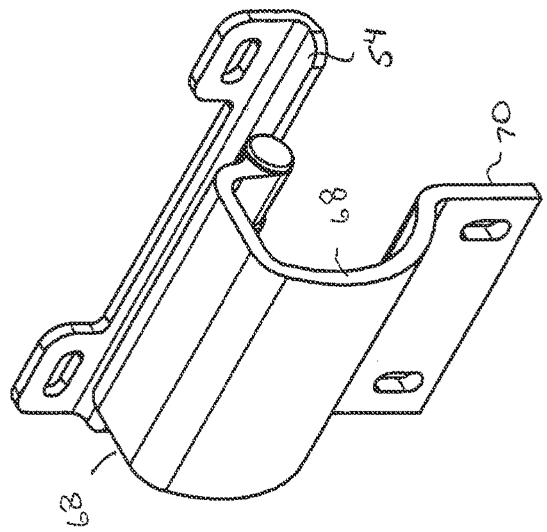
FIG. 24 is a back bottom right perspective view of the hinge.
Figure 27:
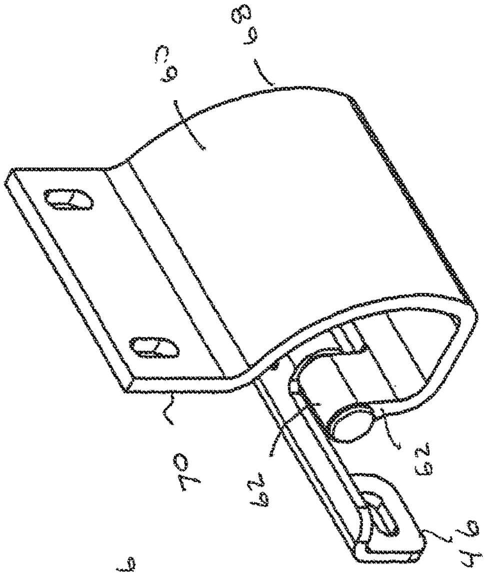
FIG. 27 is a back top right perspective view of the hinge.
Figure 26:
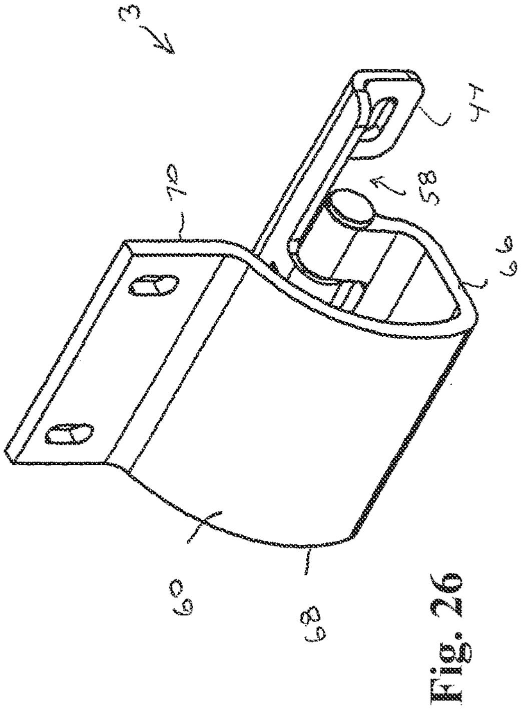
FIG. 26 is a back top left perspective view of the hinge.
Figure 29:
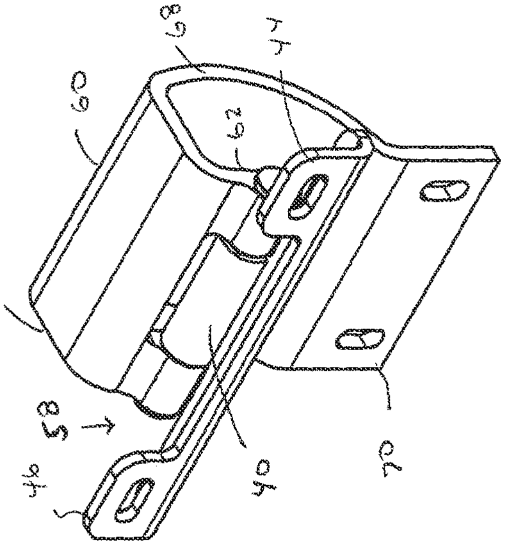
FIG. 29 is a front bottom left perspective view of the hinge.
Figure 28:
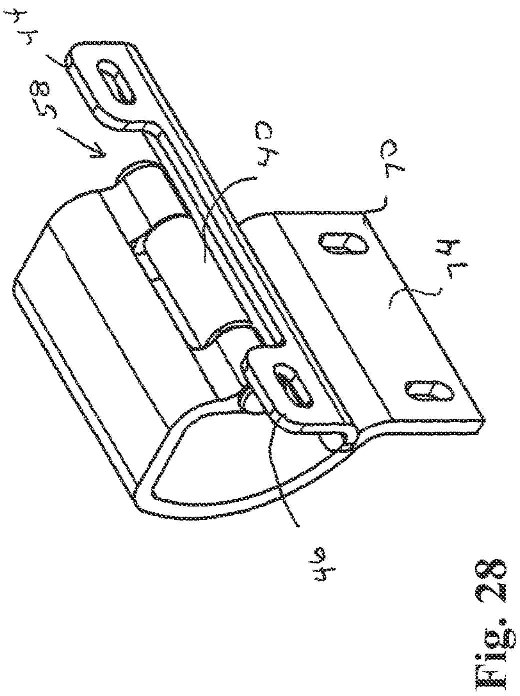
FIG. 28 is a front bottom right perspective view of the hinge.
Figure 30:
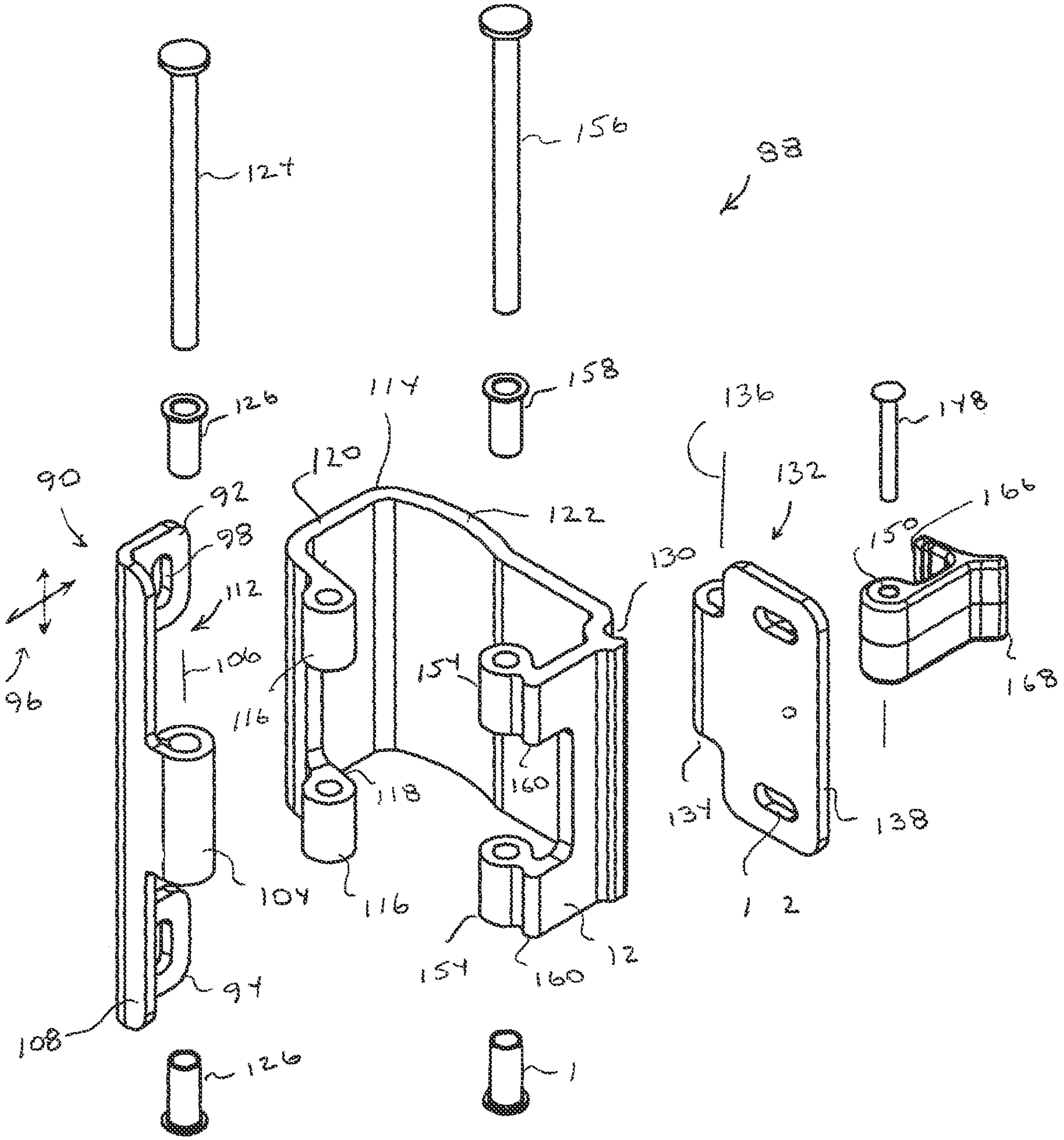
FIG. 30 is an exploded view of an alternative hinge.

FIGS. 17-29 show the exemplary hinge 36 in a hinge open position. As represented in FIG. 17, in the hinge open position the body door 84 is disposed away from the body opening 82. In the exemplary arrangement the primary hinge strap 60 is disposed at generally 900 from the angular position of the primary hinge strap in the hinge closed position. As used herein about or generally 900 refers to 900 plus or minus 30°. In exemplary arrangements the rotational movement of the hinge from the hinge closed position to the hinge open position may be limited by a stop. Such a stop may include an arm, a finger, a rod or other structure that limits the rotational movement of the door and the hinge to the door open position. Of course these approaches are exemplary and other arrangements other approaches may be used.

In the exemplary arrangement when the hinge is moved to the hinge open position the primary hinge strap knuckle legs 64 are rotationally disposed away from the strap leg access opening 58. Further in the hinge open position the primary hinge strap offset leg 66 extends generally perpendicular to the primary hinge butt ear plane 52. This is represented in FIG. 19. Further in the exemplary arrangement in the hinge open position the primary hinge strap mounting leg 68 extends generally perpendicular to the primary hinge butt ear plane 52.

Further as can be appreciated, the exemplary door mount face 74 and the door mount 70 extend generally perpendicular to the plane of the body opening 82. Further in the exemplary arrangement in the hinge open position the hinge mount and mount face extend generally parallel to the primary hinge strap mounting leg 68 as well as generally parallel to the primary hinge strap knuckles 62.

Thus as can be appreciated, the exemplary hinge 36 enables rotational movement of the body door 84 into and away from the body opening 82 while avoiding interference and binding with the sides of the opening 82. The exemplary configuration of the hinge strap 60, the primary hinge butt 38 and the relative positions of the primary hinge butt knuckle axis 42 enables door movement relative to the body that avoids interference that would inhibit opening and closing the door. Further in the exemplary arrangement the primary hinge butt and door mount 70 are positioned within the interior area of the body and are not externally accessible in the hinge closed position. This reduces the risk of damage due to external impacts with the body. It also reduces the risk when the door is in the closed position, that the door can be opened and the interior compartment accessed by attacking the hinge components. Of course it should be understood that these benefits of the exemplary arrangement may not be utilized in all arrangements which include the features and relationships claimed herein.

FIGS. 30-58 show an alternative arrangement of a hinge 88. Alternative hinge 88 is similar to hinge 36. However the exemplary hinge 88 enables the door mount that is attached to a door to rotate in the hinge open position so that the door may selectively extend generally perpendicular and generally parallel to the plane of the body opening. This may be useful in some arrangements to facilitate accessing the compartment associated with the body opening. It may be further useful in some arrangements to have the body hinge support the door in an open position in which the door extends generally perpendicular to the plane of the body opening so that the door can be used as a work surface or a support. However, in situations where the user does not wish to have the door extending substantially outward beyond the opening, the exemplary hinge enables the door to be positioned parallel to the plane of the opening and in closer proximity to the body. Of course it should be understood that the exemplary hinge arrangement 88 may be used in other applications as well.

Figure 31:
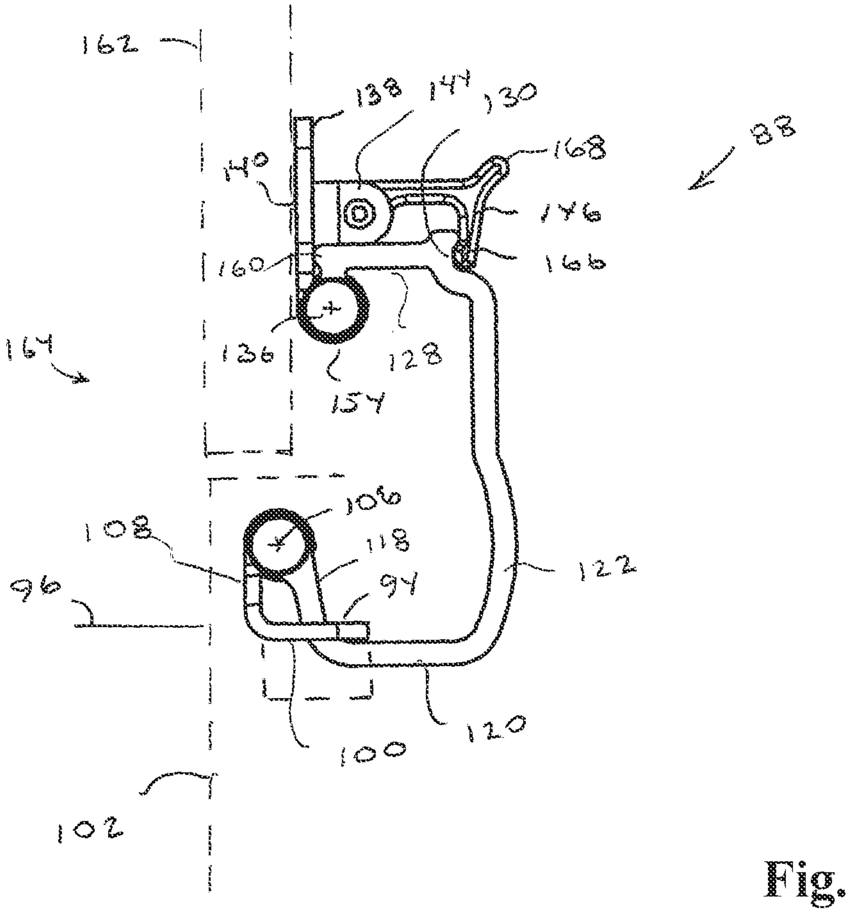
FIG. 31 is a right side view of the alternative hinge shown in a hinge closed position and with the body, body opening and door shown in phantom.
Figure 36:
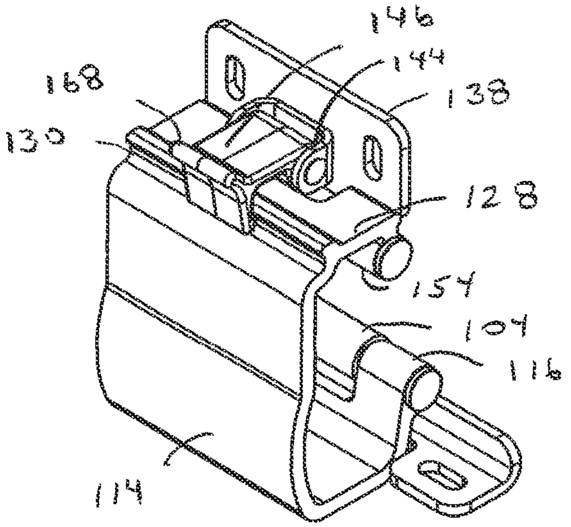
FIG. 36 is a back top right perspective view of the hinge.
Figure 37:
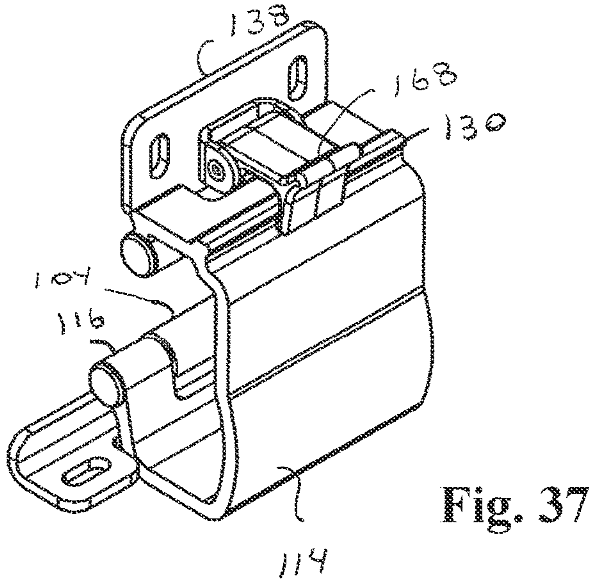
FIG. 37 is a back top left perspective view of the hinge.
Figure 38:
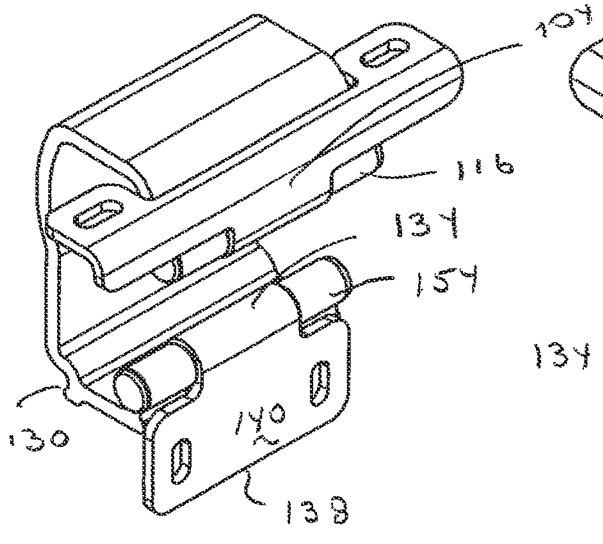
FIG. 38 is a bottom front right perspective view of the hinge.
Figure 39:
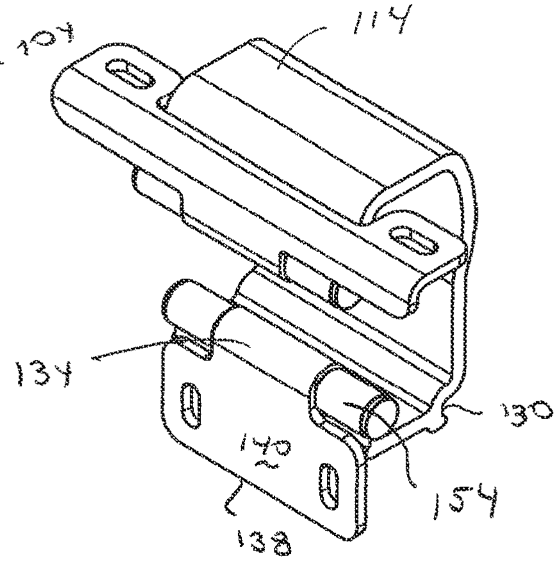
FIG. 39 is a bottom front left perspective view of the hinge.
Figure 40:
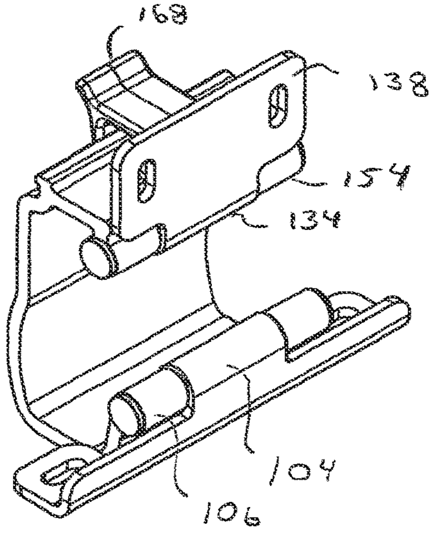
FIG. 40 is a front top right perspective view of the hinge.
Figure 41:
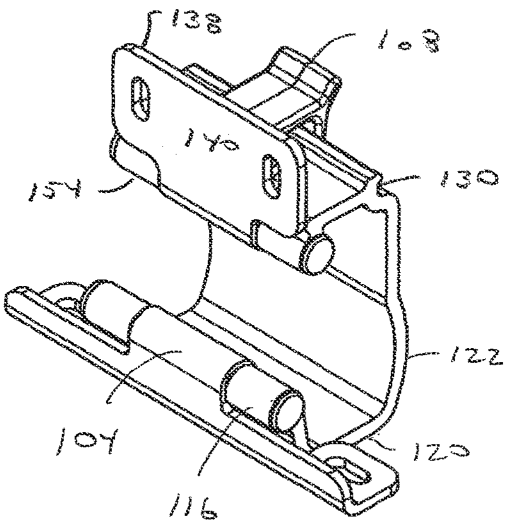
FIG. 41 is a front top left perspective view of the hinge.
Figure 42:
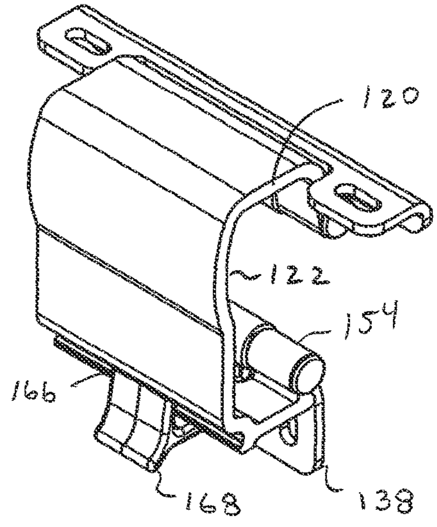
FIG. 42 is a back bottom right perspective view of the hinge.
Figure 43:
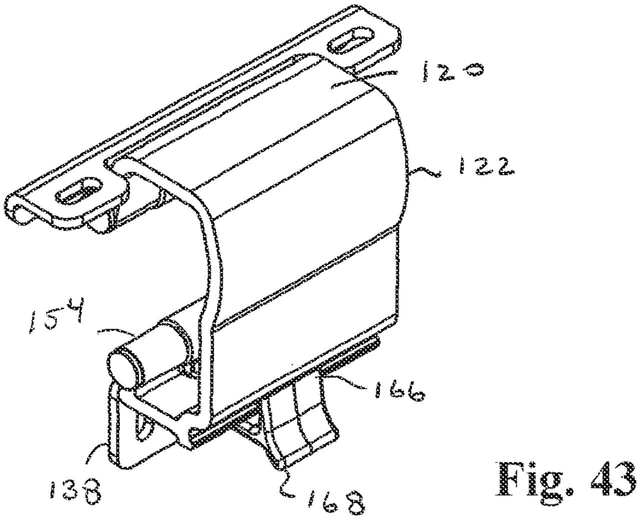
FIG. 43 is a back bottom left perspective view of the hinge.

The exemplary hinge 88 includes a primary hinge butt 90. In the exemplary arrangement the primary hinge butt 90 is generally the same as primary hinge butt 38 of the previously described arrangement. Primary hinge butt 90 includes a pair of primary hinge butt ears 92, 94 that serve as a hinge mount. Primary hinge butt ears 92, 94 each extend in a primary hinge butt ear plane 96. Each primary hinge butt ear includes a mounting opening therein 98. The openings 98 enable the primary hinge butt 90 to be engaged in fixed operative connection with a mounting face 100 that is within the interior area of a body 102 as represented in FIG. 31.

The primary hinge butt 90 further includes a primary hinge butt knuckle 104. The primary hinge butt knuckle extends along a primary hinge butt axis 106. The primary hinge butt knuckle 104 is in fixed operative connection with a hinge butt knuckle support leg 108. The hinge butt knuckle support leg extends in a hinge butt knuckle support leg plane 110. The hinge butt knuckle support leg plane 110 extends generally perpendicular to the primary hinge butt ear plane 96 as shown in FIG. 33. Similar to primary hinge butt 38, a strap leg access opening 112 extends between the primary hinge butt ears 92, 94.

The alternative hinge arrangement 88 further includes a primary hinge strap 114. The exemplary primary hinge strap 114 includes a pair of primary hinge strap knuckles 116. The primary hinge strap knuckles extend coaxial with the primary hinge butt knuckle and along the primary hinge butt knuckle axis 106. Similar to the configuration of primary hinge strap 60, each primary hinge strap knuckle 116 is in fixed operative connection with a primary hinge strap knuckle leg 118. Each primary hinge strap knuckle leg 118 is connected tangentially and in a radially offset manner to the respective primary hinge strap knuckle 116 to which it is engaged. In the hinge closed position of the hinge 88 the primary hinge strap knuckle legs extend generally parallel to the primary hinge butt knuckle support leg 108 and the primary hinge butt knuckle support leg plane 110, and extend generally perpendicular to the primary hinge butt ear plane 96. Further in the hinge closed position the primary hinge strap knuckle legs 118 extend in the strap leg access opening 112 between the primary hinge butt ears 92 and 94. This is represented in FIGS. 31-43.

The exemplary primary hinge strap 114 of hinge 88 includes a primary hinge strap offset leg 120. The exemplary primary hinge strap offset leg is in fixed operative connection with both of the primary hinge strap knuckle legs 118. The primary hinge strap offset leg 120 extends generally perpendicular to the primary hinge strap knuckle legs. In the closed position of the hinge the exemplary primary hinge strap offset leg extends generally parallel to the primary hinge butt ear plane 96. Of course it should be understood that this configuration is exemplary and in other arrangements other configurations may be used.

The exemplary primary hinge strap 114 further includes a primary hinge strap mounting leg 122. The primary hinge strap mounting leg 122 is in fixed operative connection with the primary hinge strap offset leg 120 and extends generally perpendicular thereto. As a result in the hinge closed position the exemplary primary hinge strap mounting leg extends generally parallel to the primary hinge strap knuckle legs 118 and the primary hinge butt support leg plane 110. The primary hinge strap mounting leg is disposed from the primary hinge strap knuckle legs an offset leg distance in a manner similar to the primary hinge strap mounting leg 68 of hinge 36 previously discussed. Of course it should be understood that this configuration is exemplary and in other arrangements other approaches may be used.

A hinge pin 124 extends along the primary hinge butt knuckle axis 106. The hinge pin 124 extends in operatively engaged relation with each of the primary hinge butt knuckle 104 and each primary hinge strap knuckle 116. A pair of flanged bushings 126 extend in each axial end opening of the primary hinge butt knuckle 104. Bushings 126 facilitate smooth low friction relative rotational movement of the primary hinge butt 90 and the primary hinge strap 114 about the primary hinge butt axis in a manner similar to that discussed in connection with hinge 36.

The primary hinge strap mounting leg 102 of hinge 88 is in fixed operative connection with a primary hinge strap catch leg 128. The primary hinge strap catch leg 120 extends in a direction generally parallel to the primary in hinge strap offset leg 120. The primary hinge strap offset leg includes a catch 130 at a cross-sectional end thereof in axially transverse cross section. In the exemplary arrangement the catch 130 comprises a recess which is part of a disengageable latch which operates in a manner like that later discussed.

The exemplary hinge 88 further includes a secondary hinge butt 132. The secondary hinge butt 132 includes a secondary hinge butt knuckle 134. The secondary hinge butt knuckle 134 extends along a secondary hinge butt knuckle axis 136. The secondary hinge butt knuckle axis 136 extends generally parallel to the primary hinge butt knuckle axis 106 and is disposed therefrom.

The secondary hinge butt 132 further includes a door mount 138. The door mount 138 which is alternatively referred to as a secondary hinge butt mounting leaf, is in fixed operative connection with the secondary hinge butt knuckle 134. The exemplary door mount includes a generally planar door mount face 140 which includes mounting openings 142 therein. The mounting openings are configured to receive fasteners therein. Door mount face 140 of the exemplary arrangement is configured to operate in a manner similar to door mount face 74 of the previously described hinge to engage a body door in fixed operative connection.

The exemplary door mount 138 includes in fixed operative connection therewith a clevis 144. A finger is rotationally movably mounted in operative connection with the secondary hinge butt mounting leaf through the clevis 144. A clevis pin 148 extends through openings in the walls bounding the clevis 144 and an opening 150 in the finger. In the exemplary arrangement the clevis pin 148 and the clevis extend along a clevis axis 152. The exemplary clevis axis 152 extends generally parallel to the secondary hinge butt knuckle axis 136. Of course it should be understood that this arrangement of the secondary hinge butt is exemplary and other arrangements other approaches may be used.

The exemplary primary hinge strap catch leg includes a pair of secondary hinge strap knuckles 154. Each of the secondary hinge strap knuckles 154 are in fixed operatively attached connection with the primary hinge strap catch leg at an end of the primary hinge strap catch leg opposed of the end of the primary hinge strap catch leg that includes the catch 130. Each secondary hinge strap knuckle 154 is offset from the plane of the primary hinge strap catch leg toward the primary hinge butt axis 106. Each of the secondary hinge strap knuckles 154 extends along the secondary hinge butt knuckle axis 136.

The secondary hinge butt knuckle 134 extends axially intermediate of the secondary hinge strap knuckles 154. A secondary hinge pin 156 extends along the secondary hinge butt knuckle axis 136. The secondary hinge pin 156 extends in operative engagement with each of the secondary hinge strap knuckles 154 and the secondary hinge butt knuckle 134. A pair of flanged bushings 158 extend in axially opposed ends of the secondary hinge butt knuckle 134. The flange bushings 158 facilitate relative rotational movement of the secondary hinge butt 132 and the primary hinge strap 114 about the axis 136.

The exemplary primary hinge strap catch leg further includes a stop 160. The exemplary stop 160 comprises a pair of stop surfaces adjacent the catch leg end adjacent to the secondary hinge strap knuckles 154. As shown in FIG. 33 the stop 160 abuttingly engages a face of the door mount 138 and prevents further rotation in a rotational direction R beyond a point of engagement of the door mount with the stop 160. As represented in FIGS. 31 and 33 in the hinge closed position the stop 160 serves to prevent rotational movement of the door mount and the body door 162 to which the door mount is engaged. This helps to maintain the position of the door 162 in generally parallel aligned relation with the plane of the body opening 164 and the adjacent surface of the body 102 in the hinge closed position.

In the exemplary arrangement the catch 130 and the finger 146 comprise a releasable latch. The exemplary finger 146 includes a projection 166 that is configured to releasably engage the catch 130. In the exemplary arrangement the finger is comprised of resilient material which facilitates the engagement and disengagement of the finger projection 166 and the catch 130. The exemplary finger includes a central stalk and further includes a lever portion 168 that extends on a side of the stalk generally opposed of the projection 166. The exemplary lever portion can be manually moved to cause the projection 166 to move out of engagement from the catch 130. Rotational movement of the finger 146 in the clevis 144 about the clevis axis 152 enables the finger be moved out of the way when the finger is disengaged from the catch. Of course it should be understood that this approach is exemplary and in other arrangements other approaches may be used.

In the exemplary arrangement the configuration of the primary hinge strap, the finger and the catch comprise a releasable latch that is in operative connection with the primary hinge butt and the secondary hinge butt. The releasable latch is selectively changeable between a latch engaged condition and a latch disengaged condition. In the latch engaged condition the finger is engaged with the catch and causes the secondary hinge butt to be in a fixed rotational position relative to the secondary hinge butt knuckle axis. When the releasable latch is in a disengaged condition which corresponds to the finger 146 not being in engagement with the catch 130, the secondary hinge butt is enabled to rotate about the secondary hinge butt knuckle axis. As subsequently explained, this enables the door to be rotationally movable in the open position about the secondary hinge butt axis such that the exemplary door can be moved to a position that is generally parallel to the plane of the body opening.

It should be understood however that the releasable latch configuration shown is only one of many releasable latch configurations that may be utilized in exemplary arrangements. For example in other arrangements latches may include other types of engaging projections, recesses, jaws, cams, pawls, screws and other structures that are operative to enable holding the secondary hinge butt in a fixed rotational position relative to the secondary hinge butt axis in an engaged condition, and enabling the secondary hinge butt to rotate about the secondary hinge butt axis in a disengaged condition.

In the hinge closed position of the alternative hinge 88, a body door 162 may be held in closing relation of the body opening 164. This is represented in FIG. 31. As can be appreciated in this hinge closed position, and with the releasable latch in the engaged condition, the door 162 is prevented by the stop 160 from moving in the body opening about the secondary hinge butt axis 136. As can be appreciated from FIG. 31, the door 162 is prevented from moving about the hinge butt axis in a counterclockwise direction by the engaged condition of the finger 146 and the catch 130. The door 162 is further prevented from moving about the secondary hinge butt axis 136 in a clockwise direction by the engagement of the door mount 138 and the stop surfaces of the stop 160 on the primary hinge strap catch leg 128.

In the closed position of the hinge 88 the primary hinge strap knuckle legs 118 extend in the strap leg access opening 112 between the primary hinge butt ears 92, 94. The primary hinge strap offset leg 120 and the primary hinge strap mounting leg 122 are configured to position the door mount 138 in a position in which the door 162 extends in and closes the opening 164 in the closed position of the hinge. FIGS. 31-43 show the alternative hinge 88 in the hinge closed position.

The alternative hinge 88 is movable from the hinge closed position to the hinge open position shown in FIGS. 44-51. In the hinge open position and latch engaged condition, the primary hinge strap 114 is positioned generally 900 from the position of the primary hinge strap in the hinge closed position.

As shown in the hinge open position and the latch engaged condition, the primary hinge strap knuckle legs 118 are disposed away from the strap leg access opening 112. The primary hinge strap offset leg 120 extends generally perpendicular to the primary hinge butt ear plane 96. The primary hinge strap mounting leg 122 and the door mount 138 and door mount face 140 extend generally parallel to the primary hinge butt ear plane.

Figure 44:
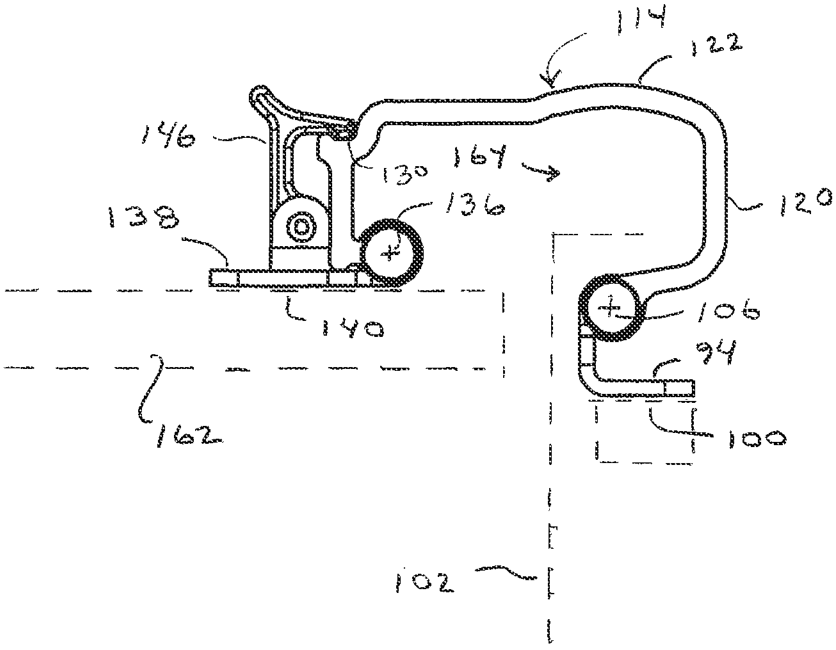
FIG. 44 is a right side view of the alternative hinge in a hinge open position with the body, body opening and door shown in phantom.
Figure 45:
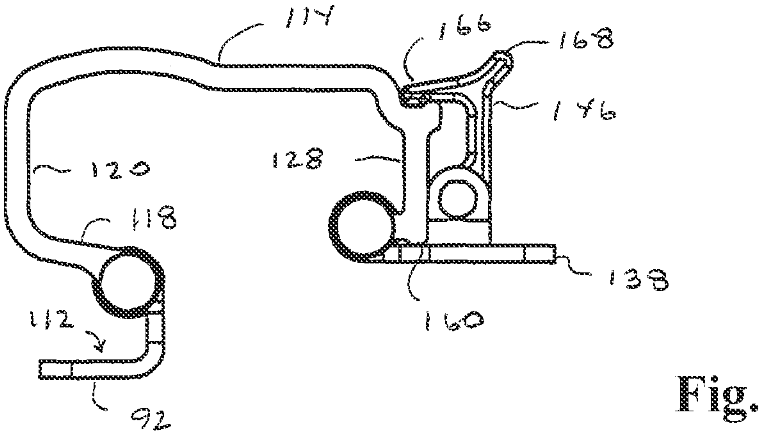
FIG. 45 is a left side view of the hinge in the hinge open position.
Figure 46:
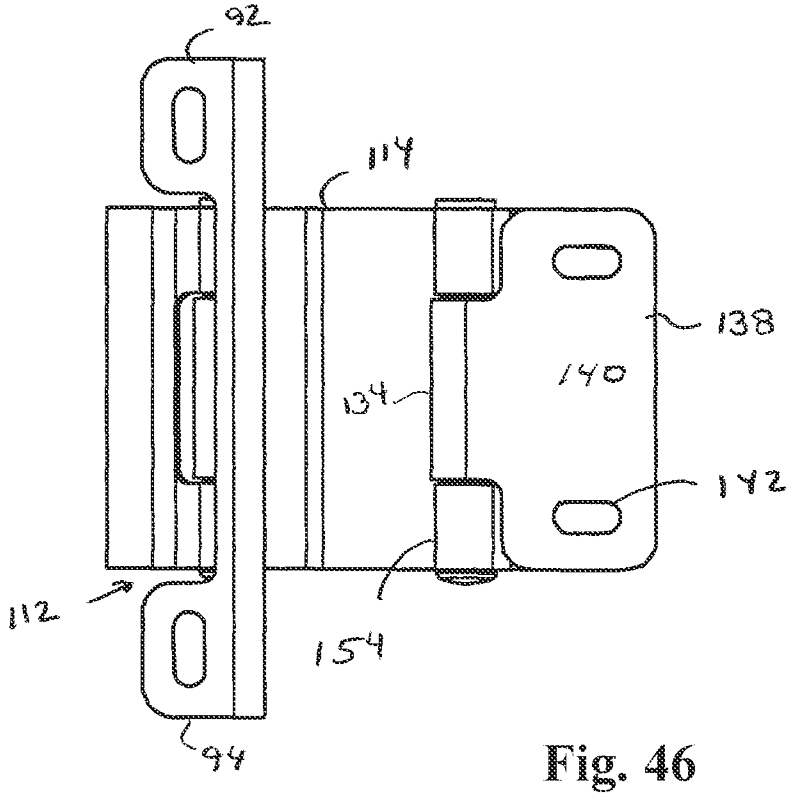
FIG. 46 is a bottom view of the hinge.
Figure 47:
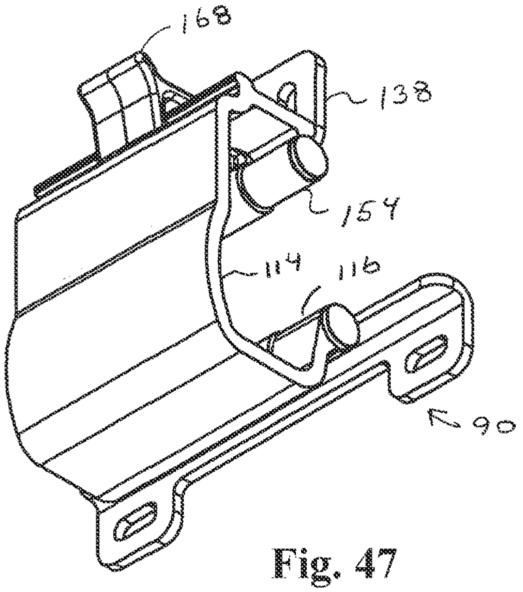
FIG. 47 is a back top left perspective view of the hinge.
Figure 48:
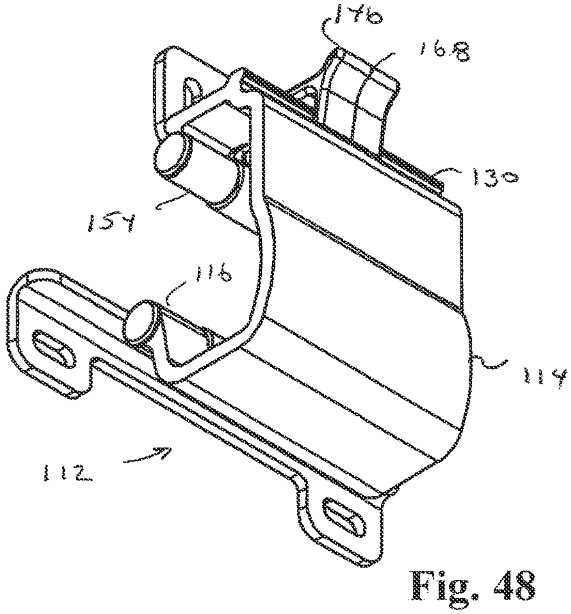
FIG. 48 is a back top right perspective view of the hinge.
Figure 49:
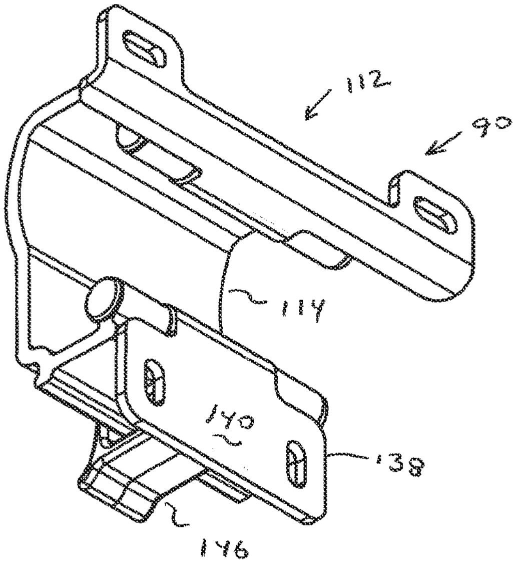
FIG. 49 is a front bottom right perspective view of the hinge.
Figure 50:
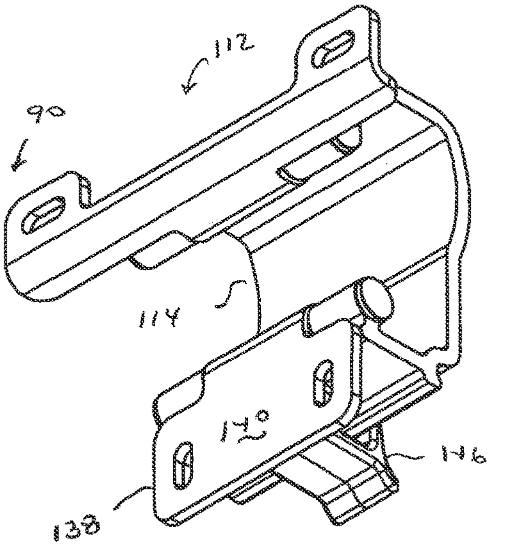
FIG. 50 is a front bottom left perspective view of the hinge.
Figure 51:
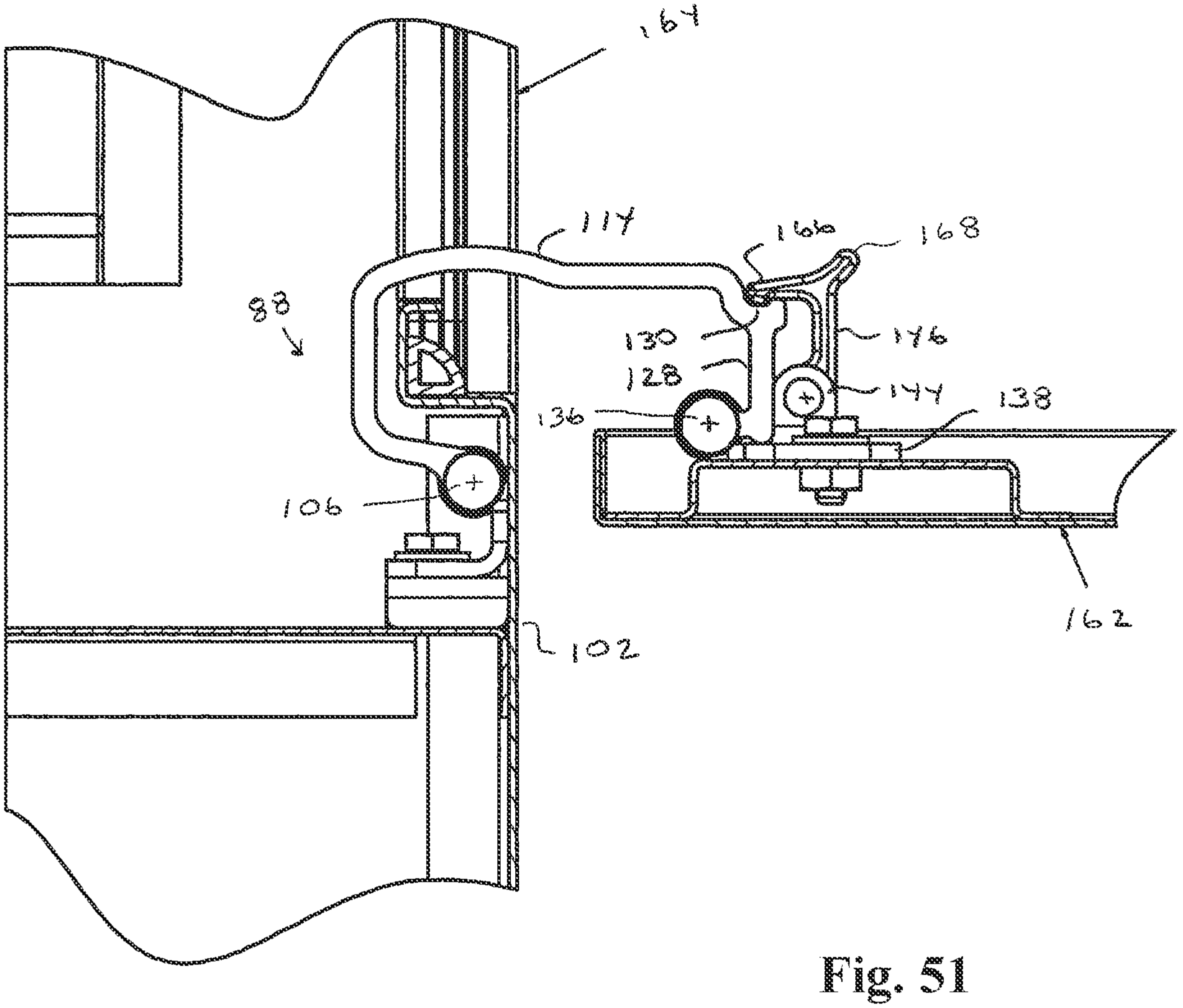
FIG. 51 is a side view showing the body, the body opening and the door with the hinge in the hinge open position and with the latch of the hinge in an engaged condition.

In the exemplary arrangement as shown in FIG. 44 and in FIG. 51, in the hinge open position and the latch engaged condition, the body door 162 is held generally perpendicular to the plane of the body opening 164. In the engaged condition of the latch the projection 166 of the finger 146 is engaged in the catch 130 of the primary hinge strap catch leg 128. As a result the secondary hinge butt is held in a fixed rotational position relative to the secondary hinge butt knuckle axis 136. In this exemplary arrangement the door 162 extends generally perpendicular to the plane of the body opening 164. This can be useful in some arrangements in which the upper face of the body door can be used as a shelf or a work surface. In some arrangements the upper surface of the door may also be used to help guide materials into the opening 164 and the compartment within the body. Of course it should be understood that this approach is exemplary and in other arrangements other approaches may be used.

In the hinge open position of the alternative hinge 88, the disengageable latch is enabled to be changed from the latch engaged condition to the latched disengaged condition. This is accomplished in the exemplary arrangement by a user manually engaging the lever portion 168 of the finger 146. Pressing the lever portion 168 downward as shown in FIG. 51 is operative to cause the projection 166 to rotate in a clockwise direction about the stalk or central leg of the finger as shown. This causes the projection 166 to disengage from the catch 130. As a result the secondary hinge butt 132 is no longer held in a fixed rotational position relative to the secondary hinge butt axis 136. This enables the secondary hinge butt to rotate about the secondary hinge butt axis to the position shown in FIG. 52.

Figure 52:
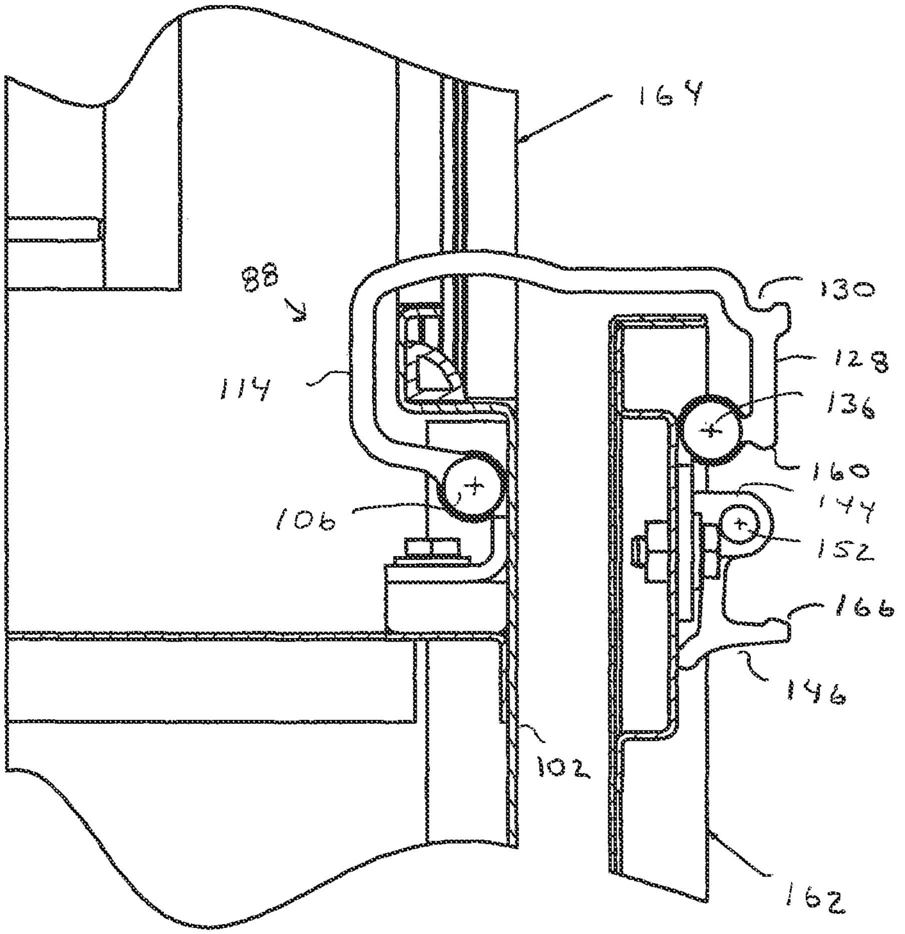
FIG. 52 is a side view similar to FIG. 51 but with the latch of the hinge in a disengaged condition and the door further rotated to extend generally parallel to the body opening.
Figure 53:
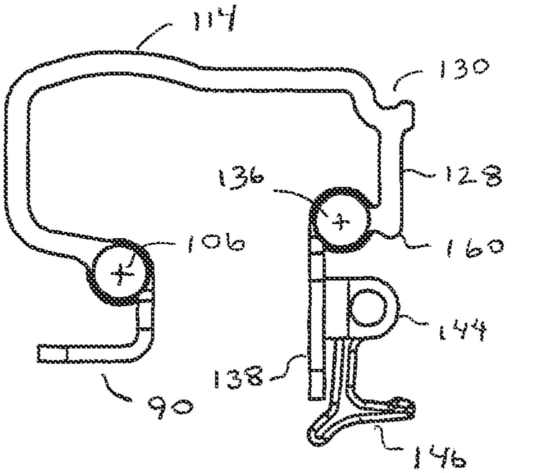
FIG. 53 is a left side view of the hinge with the latch in the disengaged condition similar to the latch shown in FIG. 52.
Figure 54:
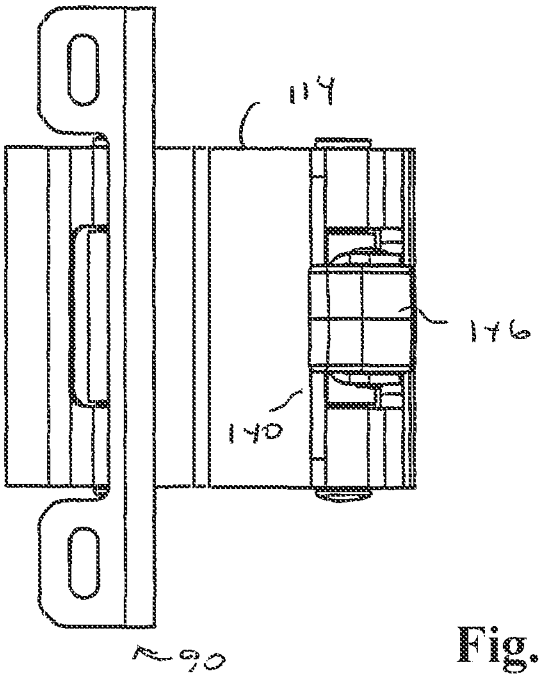
FIG. 54 is a bottom view of the hinge as shown in FIG. 53.
Figure 55:
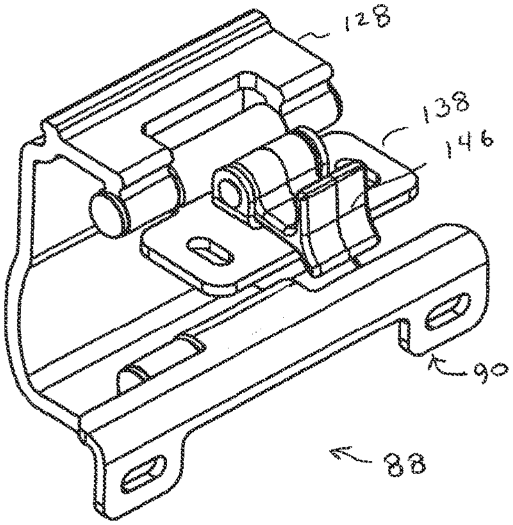
FIG. 55 is a front bottom right perspective view of the hinge.
Figure 56:
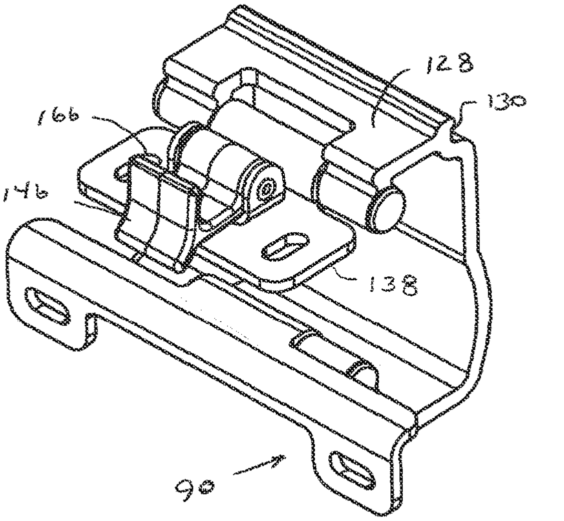
FIG. 56 is a front bottom left perspective view of the hinge.
Figure 57:
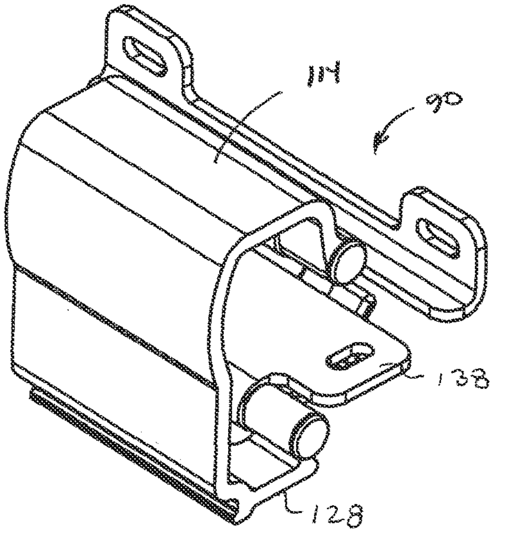
FIG. 57 is a back top right perspective view of the hinge.
Figure 58:
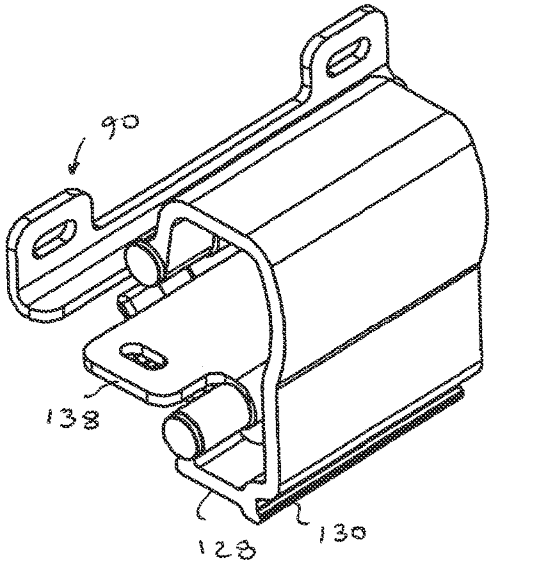
FIG. 58 is a back top left perspective view of the hinge.

In the open position of the hinge 88 and the disengaged condition of the latch, the body door 162 is enabled to rotate about the secondary hinge butt axis 136 in a clockwise direction as shown in FIG. 51 to the position shown in FIG. 52. In the position of the door shown in FIG. 52 the door 162 extends generally parallel to the plane of the body opening 164. Further in this position the finger 146 is enabled to rotate in the clevis 144 about the clevis axis 152. This enables the finger 146 to be disposed generally retracted and out of the way on the exposed surface of the door 162. As can be appreciated the body door 162 is only enabled to rotate in a clockwise direction as shown because the stop 160 prevents rotation of the door in the position shown in FIG. 51 about the axis 136 in the opposed direction.

In the exemplary arrangement the ability to rotate the door 162 to be generally parallel to the plane of body opening 164 enables the door to be in close proximity to the outer surface of the body 102. This enables a worker to move in closer proximity to the opening 164 than may be possible when the door is in the position extended generally perpendicular to the plane of the body opening 164. This may be particularly useful in situations where the door is configured to rotate about a horizontal axis relative to the body. As a result the worker is enabled to reach further into the associated compartment associated with the opening to access or remove items therefrom. Of course it should be understood that this arrangement is exemplary and in other arrangements other approaches may be used.

A worker is enabled to change the latch from the disengaged condition to the engaged condition by rotating the door 162 from the position shown in FIG. 52 to the position shown in FIG. 51. The finger 146 may be engaged with the catch 130 to hold the door 162 in the position shown in which the door extends generally perpendicular to the plane of the body opening 164. In this position the door can then be rotated and the hinge changed from the door open position to the door closed position shown in FIG. 31.

Thus the exemplary arrangements provide enhanced functionality for movably mounting a door in operative connection with a body such that an opening in the body can be selectively opened and closed. Further exemplary arrangements provide additional capabilities for selectively positioning the door so as to facilitate accessing the compartment associated with the opening when the door is in the open position. Of course it should be understood while the exemplary arrangements have been described in connection with a door that is associated with a body opening, the features and relationships described herein may also be utilized in connection with other components and arrangements which are required to be relatively movable during operation.

Exemplary arrangements may be utilized in connection with features and systems disclosed in allowed U.S. patent application Ser. No. 17/096,148 filed Nov. 12, 2020 which is incorporated herein by reference in its entirety.

Thus the exemplary arrangements described herein achieve improved operation, eliminate difficulties encountered in the use of prior devices, and achieve the useful results described herein.

In the foregoing description certain terms have been used for brevity, clarity and understanding. However no unnecessary limitations are to be implied therefrom because such terms are used for descriptive purposes and are intended to be broadly construed. Moreover the descriptions and illustrations herein are by way of examples and the inventive features are not limited to the exact features and arrangements that have been shown and described.

Further in the following claims any feature described as a means for performing a function shall be construed as encompassing any means known to those skilled in the art as being capable of carrying out the recited function, and shall not be deemed limited to only the particular means shown or described for performing the recited function in the foregoing description, or mere equivalents thereof.

It should be further understood that features and/or relationships associated with one arrangement can be combined with features and/or relationships from another arrangement. That is various features and/or relationships from various arrangements can be combined in further arrangements. The inventive scope of the disclosure is not limited only to the particular arrangements that have been shown and described.

Having described the features, discoveries and principles of the exemplary arrangements, the manner in which they are constructed and operated, and the advantages and useful results attained, the new and useful structures, devices, elements, arrangements, parts, combinations, systems, equipment, operations, methods, processes and relationships are set forth in the appended claims.

We claim:

1. Apparatus comprising:

a hinge including:

a primary hinge butt, wherein the primary hinge butt includes a pair of spaced primary hinge butt ears, wherein each primary hinge butt ear is configured to abuttingly engage a respective mounting face within a body, wherein each primary hinge butt ear extends in a common primary hinge butt ear plane, includes a respective primary hinge butt ear mounting opening therein, wherein each primary hinge butt ear mounting opening is configured to receive a fastener that is operative to hold the respective ear in fixed operative attached engagement with the respective mounting face of the body adjacent to a body opening, wherein a strap leg access opening extends between the primary hinge butt ears, a primary hinge butt knuckle support leg, wherein the primary hinge butt knuckle support leg extends in a primary hinge butt knuckle support leg plane, wherein the primary hinge butt knuckle support leg plane extends generally perpendicular to the primary hinge butt ear plane, is in fixed operative connection with each of the primary hinge butt ears, a primary hinge butt knuckle, wherein the primary hinge butt knuckle extends along a primary hinge butt knuckle axis, wherein the primary hinge butt knuckle axis extends parallel to the primary hinge butt knuckle support leg plane and parallel to the primary hinge butt ear plane, is disposed away from the primary hinge butt ears in a primary hinge butt knuckle spaced direction parallel to the primary hinge butt support leg plane, and intermediate of the ears, wherein the primary hinge butt knuckle overlies the strap leg access opening in the primary hinge butt knuckle spaced direction, a primary hinge strap, wherein the primary hinge strap includes a primary hinge strap knuckle, wherein the primary hinge strap knuckle is coaxial with the primary hinge butt knuckle axis, a primary hinge strap knuckle leg, wherein the primary hinge strap knuckle leg is in fixed operative connection with the primary hinge strap knuckle, is extendable in the strap leg access opening, a primary hinge strap offset leg, wherein the primary hinge strap offset leg is in fixed operative connection with the primary hinge strap knuckle leg, extends generally perpendicular to the primary hinge strap knuckle leg, a primary hinge strap mounting leg, wherein the primary hinge strap mounting leg, is in fixed operative connection with the primary hinge strap offset leg, extends generally parallel to the primary hinge strap knuckle leg, is disposed away from the primary hinge strap knuckle leg an offset leg distance, a hinge pin, wherein the hinge pin extends along the primary hinge butt knuckle axis and within each of the primary hinge strap knuckle and the primary hinge butt knuckle, wherein the primary hinge butt knuckle and the primary hinge strap are relatively rotatably movable in engaged relation about the primary butt hinge axis wherein the primary hinge strap mounting leg is configured to be in operatively attached connection with a body door, wherein the body door is configured to close the body opening in a hinge closed position of the hinge, and to be at least partially disposed away from the body opening in a hinge open position of the hinge, wherein in the hinge closed position the primary hinge strap knuckle leg extends in the strap leg access opening, the primary hinge strap offset leg extends generally parallel to the primary hinge butt ear plane, and the primary hinge strap mounting leg extends generally perpendicular to the primary hinge butt ear plane, wherein in the hinge open position the primary hinge strap knuckle leg is disposed away from the strap leg access opening, the primary hinge strap offset leg extends generally perpendicular to the primary hinge butt ear plane and the primary hinge strap mounting leg extends generally parallel to the primary hinge butt ear plane.

2. The apparatus according to claim 1 wherein the primary hinge strap knuckle includes a pair of primary hinge strap knuckles, wherein one primary hinge strap knuckle is disposed on a respective axial side of the primary hinge butt knuckle.

3. The apparatus according to claim 1 wherein in the hinge closed position the primary hinge strap knuckle leg extends generally parallel to the hinge butt knuckle support leg.

4. The apparatus according to claim 1 wherein the primary hinge strap mounting leg is in fixed operative connection with a door mount, wherein the door mount includes a door mount face that in the hinge closed position extends generally perpendicular to the primary hinge butt ear plane, and at least one door mount opening configured to receive at least one door mounting fastener configured to hold the door mount and the door in fixed operative engagement.

5. The apparatus according to claim 1, wherein the hinge further includes:

a secondary hinge butt, wherein the secondary hinge butt includes a secondary hinge butt leaf, wherein the secondary hinge butt leaf is configured to be in fixed operatively attached engagement with the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, and is in fixed operative connection with the secondary hinge butt leaf, a secondary hinge strap knuckle, wherein the secondary hinge strap knuckle
extends coaxially with the secondary hinge butt knuckle axis, and
is in fixed operative connection with the primary hinge strap,
a secondary hinge pin, wherein the secondary hinge pin extends
along the secondary hinge butt knuckle axis, and
in each of the secondary hinge butt knuckle and the secondary hinge strap knuckle,
wherein the secondary hinge butt leaf is rotatable relative to secondary hinge butt knuckle axis and the primary hinge strap.

6. The apparatus according to claim 1, wherein the hinge further includes:
a secondary hinge butt, wherein the secondary hinge butt includes
a secondary hinge butt leaf, wherein the secondary hinge butt leaf is configured to be in fixed operatively attached engagement with the door,
a secondary hinge butt knuckle, wherein the secondary hinge butt knuckle
extends along a secondary hinge butt knuckle axis, wherein the secondary hinge butt knuckle axis extends generally parallel to the primary hinge butt knuckle axis, and
is in fixed operative connection with the secondary hinge butt leaf,
a secondary hinge strap knuckle, wherein the secondary hinge strap knuckle
extends coaxially with the secondary hinge butt knuckle axis, and
is in fixed operative connection with the primary hinge strap,
a secondary hinge pin, wherein the secondary hinge pin extends
along the secondary hinge butt knuckle axis, and
in each of the secondary hinge butt knuckle and the secondary hinge strap knuckle,
wherein the secondary hinge butt leaf is rotatable relative to secondary hinge butt knuckle axis and the primary hinge strap,
a releasable latch, wherein the releasable latch
is in operative connection with the secondary hinge butt and the primary hinge strap,
is selectively changeable between an engaged condition and a disengaged condition,
wherein in the engaged condition the latch is operative to hold the secondary hinge butt in a fixed rotational position relative to the secondary hinge butt knuckle axis,
wherein in the disengaged condition the secondary hinge butt is enabled to rotate about the secondary hinge butt knuckle axis.

7. The apparatus according to claim 1, wherein the hinge further includes:
a secondary hinge butt, wherein the secondary hinge butt includes
a secondary hinge butt leaf, wherein the secondary hinge butt leaf is configured to be in fixed operatively attached engagement with the door,
a secondary hinge butt knuckle, wherein the secondary hinge butt knuckle
extends along a secondary hinge butt knuckle axis, wherein the secondary hinge butt knuckle axis extends generally parallel to the primary hinge butt knuckle axis,
is in fixed operative connection with the secondary hinge butt leaf,
a secondary hinge strap knuckle, wherein the secondary hinge strap knuckle
extends coaxially with the secondary hinge butt knuckle axis, and
is in fixed operative connection with the primary hinge strap,
a secondary hinge pin, wherein the secondary hinge pin extends
along the secondary hinge butt knuckle axis, and
in each of the secondary hinge butt knuckle and the secondary hinge strap knuckle,
wherein the secondary hinge butt leaf is rotatable relative to secondary hinge butt knuckle axis and the primary hinge strap,
a releasable latch, wherein the releasable latch
is in operative connection with the secondary hinge butt and the primary hinge strap,
includes a releasably engageable finger and catch,
is selectively changeable between an engaged condition in which the finger and the catch are engaged and a disengaged condition in which the finger and the catch are not engaged,
wherein in the engaged condition, the latch is operative to hold the secondary hinge butt in a fixed rotational position relative to the secondary hinge butt knuckle axis, and
wherein in the disengaged condition the secondary hinge butt is enabled to rotate about the secondary hinge butt knuckle axis.

8. The apparatus according to claim 1, wherein the hinge further includes:
a secondary hinge butt, wherein the secondary hinge butt includes
a secondary hinge butt leaf, wherein the secondary hinge butt leaf is configured to be in fixed operatively attached engagement with the door,
a secondary hinge butt knuckle, wherein the secondary hinge butt knuckle
extends along a secondary hinge butt knuckle axis, wherein the secondary hinge butt knuckle axis extends generally parallel to the primary hinge butt knuckle axis, and
is in fixed operative connection with the secondary hinge butt leaf,
a secondary hinge strap knuckle, wherein the secondary hinge strap knuckle
extends coaxially with the secondary hinge butt knuckle axis, and
is in fixed operative connection with the primary hinge strap,
a secondary hinge pin, wherein the secondary hinge pin extends
along the secondary hinge butt knuckle axis, and
in each of the secondary hinge butt knuckle and the secondary hinge strap knuckle,
wherein the secondary hinge butt leaf is rotatable relative to secondary hinge butt knuckle axis and the primary hinge strap, a releasable latch, wherein the releasable latch is in operative connection with the secondary hinge butt and the primary hinge strap, is selectively changeable between an engaged condition and a disengaged condition, wherein in the hinge closed position and in the engaged condition of the latch, the latch is operative to hold the secondary hinge butt in a fixed rotational position relative to the secondary hinge butt knuckle axis and wherein the secondary hinge butt leaf extends generally perpendicular to the primary hinge butt ear plane, and wherein in the disengaged condition the secondary hinge butt is enabled to rotate about the secondary hinge butt knuckle axis.

9. The apparatus according to claim 1, wherein the hinge further includes:

a secondary hinge butt, wherein the secondary hinge butt includes a secondary hinge butt leaf, wherein the secondary hinge butt leaf is configured to be in fixed operatively attached engagement with the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, and is in fixed operative connection with the secondary hinge butt leaf, a secondary hinge strap knuckle, wherein the secondary hinge strap knuckle extends coaxially with the secondary hinge butt knuckle axis, and is in fixed operative connection with the primary hinge strap, a secondary hinge pin, wherein the secondary hinge pin extends along the secondary hinge butt knuckle axis, and in each of the secondary hinge butt knuckle and the secondary hinge strap knuckle, wherein the secondary hinge butt leaf is rotatable relative to secondary hinge butt knuckle axis and the primary hinge strap, a releasable latch, wherein the releasable latch is in operative connection with the secondary hinge butt and the primary hinge strap, is selectively changeable between an engaged condition and a disengaged condition, wherein in the hinge closed position and in the engaged condition of the latch, the latch is operative to hold the secondary hinge butt in a fixed rotational position relative to the secondary hinge butt knuckle axis and wherein the second hinge butt leaf extends generally perpendicular to the primary hinge butt ear plane, wherein in the hinge open position and in the engaged condition of the latch, the latch is operative to hold the secondary hinge butt in the fixed rotational position relative to the secondary hinge butt knuckle axis and the secondary hinge butt leaf extends generally parallel to the primary hinge butt ear plane.

10. The apparatus according to claim 1, wherein the hinge further includes:

a secondary hinge butt, wherein the secondary hinge butt includes a secondary hinge butt leaf, wherein the secondary hinge butt leaf is configured to be in fixed operatively attached engagement with the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, is in fixed operative connection with the secondary hinge butt leaf, a secondary hinge strap knuckle, wherein the secondary hinge strap knuckle extends coaxially with the secondary hinge butt knuckle axis, and is in fixed operative connection with the primary hinge strap, a secondary hinge pin, wherein the secondary hinge pin extends along the secondary hinge butt knuckle axis, and in each of the secondary hinge butt knuckle and the secondary hinge strap knuckle, wherein the secondary hinge butt leaf is rotatable relative to secondary hinge butt knuckle axis and the primary hinge strap, a releasable latch, wherein the releasable latch is in operative connection with the secondary hinge butt and the primary hinge strap, is selectively changeable between an engaged condition and a disengaged condition, wherein in the hinge closed position and in the engaged condition of the latch, the latch is operative to hold the secondary hinge butt in a fixed rotational position relative to the secondary hinge butt knuckle axis and wherein the second hinge butt leaf extends generally perpendicular to the primary hinge butt ear plane, wherein in the hinge open position and in the engaged condition of the latch, the latch is operative to hold the secondary hinge butt in the fixed rotational position relative to the secondary hinge butt knuckle axis and wherein the secondary hinge butt leaf extends generally parallel to the primary hinge butt ear plane, wherein in the hinge open position and in the disengaged condition of the latch, the secondary hinge butt is enabled to rotate about the secondary hinge butt knuckle axis to a second rotational position, wherein in the second rotational position the secondary hinge butt leaf extends generally perpendicular to the primary hinge butt ear plane.

11. The apparatus according to claim 1, wherein the hinge further includes:

a secondary hinge butt, wherein the secondary hinge butt includes a secondary hinge butt leaf, wherein the secondary hinge butt leaf is configured to be in fixed operatively attached engagement with the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, and is in fixed operative connection with the secondary hinge butt leaf, a secondary hinge strap knuckle, wherein the secondary hinge strap knuckle extends coaxially with the secondary hinge butt knuckle axis, and is in fixed operative connection with the primary hinge strap, a secondary hinge pin, wherein the secondary hinge pin extends along the secondary hinge butt knuckle axis, and in each of the secondary hinge butt knuckle and the secondary hinge strap knuckle, wherein the secondary hinge butt leaf is rotatable relative to secondary hinge butt knuckle axis and the primary hinge strap, a releasably engageable finger and catch, wherein in an engaged condition, the finger and catch are operative to hold the secondary hinge butt in a fixed rotational position relative to the secondary hinge butt knuckle axis, and in a disengaged condition of the finger and catch, the secondary hinge butt is enabled to be rotatable about the secondary hinge butt knuckle axis, wherein in the hinge closed position and in the engaged condition of the finger and the catch, the finger and the catch are operative to hold the secondary hinge butt in a fixed rotational position relative to the secondary hinge butt knuckle axis and wherein the second hinge butt leaf extends generally perpendicular to the primary hinge butt ear plane, wherein in the hinge open position and in the engaged condition of the finger and the catch, the finger and the catch are operative to hold the secondary hinge butt in the fixed rotational position relative to the secondary hinge butt knuckle axis and wherein the secondary hinge butt leaf extends generally parallel to the primary hinge butt ear plane, wherein in the hinge open position and in the disengaged condition of the finger and the catch, the secondary hinge butt is enabled to rotate about the secondary hinge butt knuckle axis to a second rotational position wherein in the second rotational position the secondary hinge butt leaf extends generally perpendicular to the primary hinge butt ear plane.

12. The apparatus according to claim 1, wherein the hinge further includes:

a secondary hinge butt, wherein the secondary hinge butt includes a secondary hinge butt leaf, wherein the secondary hinge butt leaf is configured to be in fixed operatively attached engagement with the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, and is in fixed operative connection with the secondary hinge butt leaf, a secondary hinge strap knuckle, wherein the secondary hinge strap knuckle extends coaxially with the secondary hinge butt knuckle axis, and is in fixed operative connection with the primary hinge strap, a secondary hinge pin, wherein the secondary hinge pin extends along the secondary hinge butt knuckle axis, and in each of the secondary hinge butt knuckle and the secondary hinge strap knuckle, wherein the secondary hinge butt leaf is rotatable relative to secondary hinge butt knuckle axis and the primary hinge strap, a releasably engageable finger and catch, wherein the finger is rotationally movably mounted in operatively attached connection with the secondary hinge butt mounting leaf, and wherein the catch is in operatively attached connection with the primary hinge strap, wherein in an engaged condition, the finger and catch are operative to hold the secondary hinge butt in a fixed rotational position relative to the secondary hinge butt knuckle axis, and in a disengaged condition of the finger and catch, the secondary hinge butt is enabled to be rotatable about the secondary hinge butt knuckle axis, wherein in the hinge closed position and in the engaged condition of the finger and the catch, the finger and the catch are operative to hold the secondary hinge butt in a fixed rotational position relative to the secondary hinge butt knuckle axis and wherein the second hinge butt leaf extends generally perpendicular to the primary hinge butt ear plane, wherein in the hinge open position and in the engaged condition of the finger and the catch, the finger and the catch are operative to hold the secondary hinge butt in the fixed rotational position relative to the secondary hinge butt knuckle axis and wherein the secondary hinge butt leaf extends generally parallel to the primary hinge butt ear plane, wherein in the hinge open position and in the disengaged condition of the finger and the catch, the secondary hinge butt is enabled to rotate about the secondary hinge butt knuckle axis to a second rotational position, wherein in the second rotational position the secondary hinge butt leaf extends generally perpendicular to the primary hinge butt ear plane.

13. The apparatus according to claim 1, wherein the hinge further includes:

a secondary hinge butt, wherein the secondary hinge butt includes a secondary hinge butt leaf, wherein the secondary hinge butt leaf is configured to be in fixed operatively attached engagement with the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, and is in fixed operative connection with the secondary hinge butt leaf, a secondary hinge strap knuckle, wherein the secondary hinge strap knuckle extends coaxially with the secondary hinge butt knuckle axis, and is in fixed operative connection with the primary hinge strap, a secondary hinge pin, wherein the secondary hinge pin extends along the secondary hinge butt knuckle axis, and in each of the secondary hinge butt knuckle and the secondary hinge strap knuckle, wherein the secondary hinge butt leaf is rotatable relative to secondary hinge butt knuckle axis and the primary hinge strap, a releasably engageable finger and catch, wherein the finger is rotationally movably mounted in operatively attached connection with the secondary hinge butt leaf, and wherein the primary hinge strap includes a primary hinge strap catch leg, wherein the primary hinge strap catch leg is in fixed operatively attached connection with the primary hinge strap mounting leg, extends generally parallel with the primary hinge strap offset leg, and includes the catch, wherein in an engaged condition, the finger and catch are operative to hold the secondary hinge butt in a fixed rotational position relative to the secondary hinge butt knuckle axis, and in a disengaged condition of the finger and catch, the secondary hinge butt is enabled to be rotatable about the secondary hinge butt knuckle axis, wherein in the hinge closed position and in the engaged condition of the finger and the catch, the finger and the catch are operative to hold the secondary hinge butt in a fixed rotational position relative to the secondary hinge butt knuckle axis and wherein the secondary hinge butt leaf extends generally perpendicular to the primary hinge butt ear plane, wherein in the hinge open position and in the engaged condition of the finger and the catch, the finger and the catch are operative to hold the secondary hinge butt in the fixed rotational position relative to the secondary hinge butt knuckle axis and wherein the secondary hinge butt leaf extends generally parallel to the primary hinge butt ear plane, wherein in the hinge open position and in the disengaged condition of the finger and the catch, the secondary hinge butt is enabled to rotate about the secondary hinge butt knuckle axis to a second rotational position, wherein in the second rotational position the secondary hinge butt leaf extends generally perpendicular to the primary hinge butt ear plane.

14. The apparatus according to claim 1, wherein the hinge further includes:

a secondary hinge butt, wherein the secondary hinge butt includes a secondary hinge butt leaf, wherein the secondary hinge butt leaf is configured to be in fixed operatively attached engagement with the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, and is in fixed operative connection with the secondary hinge butt leaf, a secondary hinge strap knuckle, wherein the secondary hinge strap knuckle extends coaxially with the secondary hinge butt knuckle axis, and is in fixed operative connection with the primary hinge strap, a secondary hinge pin, wherein the secondary hinge pin extends along the secondary hinge butt knuckle axis, and in each of the secondary hinge butt knuckle and the secondary hinge strap knuckle, wherein the secondary hinge butt leaf is rotatable relative to secondary hinge butt knuckle axis and the primary hinge strap, a releasably engageable finger and catch, wherein the finger is rotationally movably mounted in operatively attached connection with the secondary hinge butt leaf, and wherein the primary hinge strap includes a primary hinge strap catch leg, wherein the primary hinge strap catch leg is in fixed operatively attached connection with the primary hinge strap mounting leg, extends generally parallel with the primary hinge strap offset leg, includes a stop at a first catch leg end, wherein the stop is operative to limit rotation of the secondary hinge butt leaf in a first rotational direction about the secondary hinge butt knuckle axis, and includes the catch at a second catch leg end opposed of the first catch legend, wherein in an engaged condition, the finger and catch are operative to hold the secondary hinge butt in a fixed rotational position relative to the secondary hinge butt knuckle axis, and in a disengaged condition of the finger and catch, the secondary hinge butt is enabled to be rotatable in a second rotatable direction opposed of the first rotatable direction about the secondary hinge butt knuckle axis, wherein in the hinge closed position and in the engaged condition of the finger and the catch, the finger and the catch are operative to hold the secondary hinge butt in a fixed rotational position relative to the secondary hinge butt knuckle axis and wherein the second hinge butt leaf extends generally perpendicular to the primary hinge butt ear plane, wherein in the hinge open position and in the engaged condition of the finger and the catch, the finger and the catch are operative to hold the secondary hinge butt in the fixed rotational position relative to the secondary hinge butt knuckle axis, and wherein the secondary hinge butt leaf extends generally parallel to the primary hinge butt ear plane, wherein in the hinge open position and in the disengaged condition of the finger and the catch, the secondary hinge butt is enabled to rotate about the secondary hinge butt knuckle axis in the second rotatable direction to a second rotational position wherein in the second rotational position the secondary hinge butt leaf extends generally perpendicular to the primary hinge butt ear plane.

15. The apparatus according to claim 1, wherein the hinge further includes:

a secondary hinge butt, wherein the secondary hinge butt includes a secondary hinge butt leaf, wherein the secondary hinge butt leaf is configured to be in fixed operatively attached engagement with the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, and is in fixed operative connection with the secondary hinge butt leaf, a secondary hinge strap knuckle, wherein the secondary hinge strap knuckle extends coaxially with the secondary hinge butt knuckle axis, and is in fixed operative connection with the primary hinge strap, a secondary hinge pin, wherein the secondary hinge pin extends along the secondary hinge butt knuckle axis, and in each of the secondary hinge butt knuckle and the secondary hinge strap knuckle, wherein the secondary hinge butt leaf is rotatable relative to secondary hinge butt knuckle axis and the primary hinge strap, a releasably engageable resilient finger and a catch, wherein the finger is mounted in operatively attached connection with the secondary hinge butt leaf, and wherein the catch is in fixed operatively attached connection with the primary hinge strap mounting leg, wherein in an engaged condition, the finger and catch are operative to hold the secondary hinge butt in a fixed rotational position relative to the secondary hinge butt knuckle axis, and in a disengaged condition of the finger and catch, the secondary hinge butt is enabled to be rotatable about the secondary hinge butt knuckle axis, wherein in the hinge closed position and in the engaged condition of the finger and the catch, the finger and the catch are operative to hold the secondary hinge butt in a fixed rotational position relative to the secondary hinge butt knuckle axis and wherein the second hinge butt leaf extends generally perpendicular to the primary hinge butt ear plane, wherein in the hinge open position and in the engaged condition of the finger and the catch, the finger and the catch are operative to hold the secondary hinge butt in the fixed rotational position relative to the secondary hinge butt knuckle axis, and wherein the secondary hinge butt leaf extends generally parallel to the primary hinge butt ear plane, wherein in the hinge open position and in the disengaged condition of the finger and the catch, the secondary hinge butt is enabled to rotate about the secondary hinge butt knuckle axis to a second rotational position, wherein in the second rotational position the secondary hinge butt leaf extends generally perpendicular to the primary hinge butt ear plane.

16. The apparatus according to claim 1, and further comprising:

the body, the opening in the body, and the door, wherein the opening is bounded by a plurality of sides including a hinge side, wherein the primary hinge butt ears are mounted in fixed operative connection with the mounting faces and are disposed within the body adjacent to the hinge side of the opening, wherein in the hinge closed position the door extends in and closes the opening, and wherein in the hinge open position the primary hinge strap mounting leg extends in the opening and in outwardly overlying relation of the hinge side.

17. The apparatus according to claim 1, and further comprising:

the body, the opening in the body, and the door, wherein the opening is bounded by a plurality of sides including a hinge side, wherein the primary hinge butt ears are mounted in fixed operative connection with the mounting faces and are disposed within the body adjacent to the hinge side of the opening, wherein in the hinge closed position the door extends in and closes the opening, and wherein in the hinge open position the primary hinge strap mounting leg extends in the opening and in outwardly overlying relation of the hinge side, wherein the hinge further includes:

a secondary hinge butt, wherein the secondary hinge butt includes a secondary hinge butt leaf, wherein the secondary hinge butt leaf is in fixed operatively attached engagement with and extends generally parallel to the door, a secondary hinge butt knuckle, wherein the secondary hinge butt knuckle extends along a secondary hinge butt knuckle axis, wherein the secondary hinge butt knuckle axis extends generally parallel to the primary hinge butt knuckle axis, and is in a fixed operative connection with the secondary hinge butt leaf a secondary hinge strap knuckle, wherein the secondary hinge strap knuckle extends coaxially with the secondary hinge butt knuckle axis, and is in fixed operative connection with the primary hinge strap, a secondary hinge pin, wherein the secondary hinge pin extends along the secondary hinge butt knuckle axis, and extends in each of the secondary hinge butt knuckle and the secondary hinge strap knuckle, wherein the secondary hinge butt leaf is rotatable relative to secondary hinge butt knuckle axis and the primary hinge strap, a releasable latch, wherein the releasable latch is in operative connection with the secondary hinge butt and the primary hinge strap, is selectively changeable between an engaged condition and a disengaged condition, wherein in the hinge closed position and in the engaged condition of the latch, the latch is operative to hold the secondary hinge butt in a fixed rotational position relative to the secondary hinge butt knuckle axis, and wherein the secondary hinge butt leaf and the door extend generally perpendicular to the primary hinge butt ear plane and close the opening, wherein in the hinge open position and in the engaged condition of the latch, the latch is operative to hold the secondary hinge butt in the fixed rotational position relative to the secondary hinge butt knuckle axis and wherein the secondary hinge butt leaf and the door extend generally parallel to the primary hinge butt ear plane, wherein in the hinge open position and in the disengaged condition of the latch, the secondary hinge butt is enabled to rotate about the secondary hinge butt knuckle axis to a second rotational position, wherein in the second rotational position the secondary hinge butt leaf and the door extend outside the body and generally perpendicular to the primary hinge butt ear plane.

18. Apparatus comprising:

a hinge including:

a primary hinge butt, wherein the primary hinge butt includes a hinge mount, wherein the hinge mount is configured to engage a body in fixed operatively attached engagement, wherein the body includes a body opening that is closable by a relatively movable body door, a primary hinge butt knuckle, wherein the primary hinge butt knuckle extends along a primary axis, a primary hinge strap, wherein the primary hinge strap includes a primary hinge strap knuckle, wherein the primary hinge strap knuckle is coaxial with the primary axis and is relatively rotationally movable about the primary axis in operative attached connection with the primary hinge butt knuckle, a primary hinge strap leg that is in fixed operatively attached connection with the primary hinge butt knuckle, a secondary hinge strap knuckle, wherein the secondary hinge strap knuckle is in fixed operatively attached connection with the primary hinge strap leg, and extends along a secondary axis, wherein the secondary axis extends generally parallel to and is disposed away from the primary axis, a secondary hinge butt, wherein the secondary hinge butt includes a door mount, wherein the door mount is configured to engage the body door in fixed operatively engaged relation, a secondary hinge butt knuckle, wherein the secondary hinge butt knuckle is in fixed operatively attached connection with the door mount, extends along the secondary axis and is rotatably movable about the secondary axis in operatively attached connection with the secondary hinge strap knuckle, a releasable latch, wherein the releasable latch is in operative connection with the secondary hinge butt and the primary hinge butt, and is selectively changeable between an engaged condition and a disengaged condition, wherein the hinge is moveable through relative rotational movement about the primary axis of primary hinge butt and the primary hinge strap, between a hinge closed position and a hinge open position, wherein in the hinge closed position the secondary axis is in a first angular position relative to the primary axis, and the hinge is configured to enable the body door to close the body opening, and wherein in the hinge closed position and in the engaged condition of the latch, the latch is operative to hold the secondary hinge butt in a fixed rotational position relative to the secondary axis, wherein in the hinge open position the secondary axis is in a second angular position relative to the primary axis, wherein the second angular position is disposed about 900 from the first angular position, the hinge is configured to cause the body door to be at least partially disposed away from the body opening, and wherein in the hinge open position and in the engaged condition of the latch, the latch is operative to hold the secondary hinge butt in the fixed rotational position, and wherein in the hinge open position and the disengaged condition of the latch, the door mount is rotationally movable relative to the primary hinge strap about the secondary axis, whereby the door is rotationally movable about the secondary axis.

19. The apparatus according to claim 18 wherein the latch includes a releasably engageable finger and catch, wherein in an engaged condition, the finger and catch are operative to hold the secondary hinge butt in the fixed rotational position relative to the secondary axis, and in a disengaged condition of the finger and the catch, the secondary hinge butt is enabled to be rotatable about the secondary axis, wherein in the hinge closed position and in the engaged condition of the finger and the catch, the latch is operative to hold the secondary hinge butt in the fixed rotational position relative to the secondary axis, wherein in the hinge open position and in the disengaged condition of the finger and the catch, the door mount is rotationally movable about the secondary axis.

20. The apparatus according to claim 18 wherein the latch includes a releasably engageable resilient finger and a catch, wherein the finger is mounted in operatively attached connection with the door mount, and wherein the catch is in fixed operatively attached connection with the primary hinge strap leg, wherein in an engaged condition, the finger and catch are operative to hold the secondary hinge butt in the fixed rotational position relative to the secondary axis, and in a disengaged condition of the finger in the catch, the secondary hinge butt is enabled to be rotatable about the secondary axis, wherein in the hinge closed position and in the engaged condition of the finger and the catch, the latch is operative to hold the secondary hinge butt in the fixed rotational position relative to the secondary axis, wherein in the hinge open position and in the disengaged condition of the finger and the catch, the door mount is rotationally movable about the secondary axis.

21. The apparatus according to claim 18 wherein the latch includes a releasably engageable finger and catch, wherein the finger is rotationally movably mounted in operatively attached connection with the door mount, and wherein the catch is in fixed operatively attached connection with the primary hinge strap leg, wherein in an engaged condition, the finger and catch are operative to hold the secondary hinge butt in the fixed rotational position relative to the secondary axis, and in a disengaged condition of the finger in the catch, the secondary hinge butt is enabled to be rotatable about the secondary axis, wherein in the hinge closed position and in the engaged condition of the finger and the catch, the latch is operative to hold the secondary hinge butt in the fixed rotational position relative to the secondary axis, wherein in the hinge open position and in the disengaged condition of the finger and the catch, the door mount is rotationally movable about the secondary axis.

22. The apparatus according to claim 18 wherein the latch includes a releasably engageable finger and catch, wherein the finger is rotationally movably mounted in operatively attached connection with the door mount, and wherein the catch is in fixed operatively attached connection with the primary hinge strap leg, wherein the primary hinge strap leg is in fixed operative connection with a stop, wherein the stop is operative to limit rotation of the door mount in a first rotational direction about the secondary axis, wherein in an engaged condition, the finger and catch are operative to hold the secondary hinge butt in the fixed rotational position relative to the secondary axis, and in a disengaged condition of the finger in the catch, the secondary hinge butt is only enabled to be rotatable from the fixed rotational position in a second rotatable direction opposed of the first rotatable direction about the secondary axis, wherein in the hinge closed position and in the engaged condition of the finger and the catch, the latch is operative to hold the secondary hinge butt in the fixed rotational position relative to the secondary axis, wherein in the hinge open position and in the disengaged condition of the finger and the catch, the door mount is rotationally movable about the secondary axis.

23. The apparatus according to claim 18 wherein the hinge mount includes a pair of spaced primary hinge butt ears, wherein each primary hinge butt ear is configured to abuttingly engage a respective mounting face within the body, wherein each primary hinge butt ear extends in a common primary hinge butt ear plane, includes a respective primary hinge butt ear mounting opening therein, wherein each primary hinge butt ear mounting opening is configured to receive a fastener that is operative to hold the respective ear in fixed operative attached engagement with the respective mounting face of the body adjacent to the body opening, wherein a strap leg access opening extends between the primary hinge butt ears, wherein in the hinge closed position the primary hinge strap leg extends in the strap leg access opening, and wherein in the hinge open position the primary hinge strap leg is disposed away from the strap leg access opening.

24. The apparatus according to claim 23 wherein the primary hinge butt further includes a primary hinge butt knuckle support leg, wherein the primary hinge butt knuckle support leg extends in a primary hinge butt knuckle support leg plane, wherein the primary hinge butt knuckle support leg plane extends generally perpendicular to the primary hinge butt ear plane and parallel to the primary axis, and is in fixed operative connection with the primary hinge butt ears, wherein the primary hinge butt knuckle is disposed away from the primary hinge butt ears in a primary hinge butt knuckle spaced direction parallel to the primary hinge butt support leg plane, and intermediate of the ears, wherein the primary hinge butt knuckle overlies the strap leg access opening in the primary hinge butt knuckle spaced direction, wherein the primary hinge strap includes a primary hinge strap knuckle leg, wherein the primary hinge strap knuckle leg is in fixed operative connection with the primary hinge strap knuckle, and is extendable in the strap leg access opening, a primary hinge strap offset leg, wherein the primary hinge strap offset leg is in fixed operative connection with the primary hinge strap knuckle leg, and extends generally perpendicular to the primary hinge strap knuckle leg, a primary hinge strap mounting leg, wherein the primary hinge strap mounting leg is in fixed operative connection with the primary hinge strap offset leg, extends generally parallel to the primary hinge strap knuckle leg, is disposed away from the primary hinge strap knuckle leg an offset leg distance, wherein the hinge further includes a hinge pin, wherein the hinge pin extends along the primary axis and in each of the primary hinge strap knuckle and the primary hinge butt knuckle.

25. Apparatus comprising:
a hinge including:
a primary hinge butt,
wherein the primary hinge butt includes
at least one mounting ear configured for attachment in fixed operative engagement with one of a body or a door that is movable relative to the body,
a primary hinge butt knuckle, wherein the primary hinge butt knuckle
is in fixed operative connection with the at least one mounting ear,
and
extends along a primary axis,
a primary hinge strap,
wherein the primary hinge strap includes
a primary hinge strap knuckle, wherein the primary hinge strap knuckle
extends along the primary axis,
is engaged in rotatable operative connection with the primary hinge butt knuckle, and
is rotatable relative to the primary hinge butt knuckle about the primary axis,
at least one leg, wherein the at least one leg is in fixed operative connection with the primary hinge strap knuckle,
a secondary hinge strap knuckle,
wherein the secondary hinge strap knuckle
is in fixed operative connection with the at least one leg, and
extends along a secondary axis, wherein the secondary axis is disposed from and generally parallel to the primary axis,
a secondary hinge butt,
wherein the secondary hinge butt includes
a mounting leaf, wherein the mounting leaf is configured to be in fixed operative connection with the other of the body or the door,
at least one secondary hinge butt knuckle,
wherein the secondary hinge butt knuckle
is in fixed operative connection with the mounting leaf,
extends along the secondary axis,
is engaged in operative rotatable connection with the secondary hinge strap knuckle and is rotatable about the secondary axis,
a releasable latch,
wherein the releasable latch
is in operative connection with each of the primary hinge butt and the secondary hinge butt, and
is selectively changeable between an engaged condition and a disengaged condition,
wherein in the engaged condition of the latch
the primary hinge strap is rotatable relative to the primary hinge butt about the primary axis while the secondary hinge butt is held by the latch in fixed rotatable position relative to the secondary axis and the primary hinge strap,
wherein the disengaged condition of the latch
the primary hinge strap is rotatable relative to the primary hinge butt about the primary axis and the secondary hinge butt is rotatable relative to the secondary axis and the primary hinge strap.

26. The apparatus according to claim 25
wherein the releasable catch includes
an engageable finger and catch,
wherein the finger is movably mounted in operatively attached connection with the mounting leaf, and
wherein the catch is mounted in fixed operatively attached connection with the at least one leg.

27. The apparatus according to claim 26
wherein the primary hinge butt includes
a pair of spaced primary hinge butt ears, wherein each primary hinge butt ear is configured to abuttingly engage a respective mounting face within the body,
wherein each primary hinge butt ear
extends in a common primary hinge butt ear plane,
includes a respective primary hinge butt ear mounting opening therein,
wherein each primary hinge butt ear mounting opening is configured to receive a fastener that is operative to hold the respective ear in fixed operative attached engagement with the respective mounting face of the body adjacent to a body opening,
wherein a strap leg access opening extends between the primary hinge butt ears,
a primary hinge butt knuckle support leg, wherein the primary hinge butt knuckle support leg
extends in a primary hinge butt knuckle support leg plane, wherein the primary hinge butt knuckle support leg plane extends generally perpendicular to the primary hinge butt ear plane, and
is in fixed operative connection with each of the primary hinge butt ears,
wherein the primary axis extends parallel to the primary hinge butt knuckle support leg plane and parallel to the primary hinge butt ear plane,
wherein the primary hinge butt knuckle is disposed
away from the primary hinge butt ears in a primary hinge butt knuckle spaced direction parallel to the primary hinge butt support leg plane, and
intermediate of the ears,
wherein the primary hinge butt knuckle overlies the strap leg access opening in the primary hinge butt knuckle spaced direction,
wherein the at least one leg of the primary hinge strap includes
a primary hinge strap knuckle leg, wherein the primary hinge strap knuckle leg is
in fixed operative connection with the primary hinge strap knuckle,
extendable in the strap leg access opening,
a primary hinge strap offset leg, wherein the primary hinge strap offset leg
is in fixed operative connection with the primary hinge strap knuckle leg,
extends generally perpendicular to the primary hinge strap knuckle leg,
a primary hinge strap mounting leg, wherein the primary hinge strap mounting leg
is in fixed operative connection with the primary hinge strap offset leg,
extends generally parallel to the primary hinge strap knuckle leg,
is disposed away from the primary hinge strap knuckle leg an offset leg distance,
is in fixed operative connection with the secondary hinge strap knuckle, a hinge pin, wherein the hinge pin
extends along the primary axis and in each of the primary hinge strap knuckle and the primary hinge butt knuckle, wherein the mounting leaf is configured to be in fixed operative connection with the door, wherein the door is configured to close the body opening in a closed position of the hinge, and to be disposed away from the body opening in an open position of the hinge, wherein in the closed position of the hinge the primary hinge strap knuckle leg extends in the strap leg access opening, the primary hinge strap offset leg extends generally perpendicular to the primary hinge butt ear plane, and the primary hinge strap mounting leg extends generally parallel to the primary hinge butt ear plane, wherein in the open position of the hinge the primary hinge strap knuckle leg is disposed away from the strap leg access opening, the primary hinge strap offset leg extends generally parallel to the primary hinge butt ear plane, and the primary hinge strap mounting leg extends generally perpendicular to the primary hinge butt ear plane.

* * * * *